US012737423B1

(12) United States Patent
Koc et al.

(10) Patent No.: US 12,737,423 B1
(45) Date of Patent: Sep. 15, 2026

(54) HYBRID SERVERLESS COMPUTING AND DURABLE COMPUTING SEARCH SERVICE

(71) Applicant: Amazon Technologies, Inc., Seattle, WA (US)

(72) Inventors: Ali Koc, Smithtown, NY (US); Dac Hoang Thien An Ta, Brooklyn, NY (US); John Espenhahn, San Francisco, CA (US); Nitya Dhimantkumar Sheth, Belmont, CA (US); Rajat Mathur, Sunnyvale, CA (US); Amit Gul Phagwani, Fremont, CA (US); George Steven McPherson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/095,743

(22) Filed: Mar. 31, 2025

(51) Int. Cl.
*G06F 16/93* (2019.01)
*G06F 9/455* (2018.01)
*G06F 16/3331* (2025.01)

(52) U.S. Cl.
CPC .............. *G06F 16/93* (2019.01); *G06F 9/455* (2013.01); *G06F 16/3331* (2019.01)

(58) Field of Classification Search
None
See application file for complete search history.

(56) References Cited

U.S. PATENT DOCUMENTS

| | | | | |
|---|---|---|---|---|
| 7,305,385 | B1 * | 12/2007 | Dzikiewicz | G06F 7/02 707/999.005 |
| 11,301,522 | B1 * | 4/2022 | Kim | G06N 3/09 |
| 11,495,337 | B1 * | 11/2022 | Malachi | G06F 16/81 |
| 12,182,311 | B1 * | 12/2024 | Ardhanari | G06F 21/6254 |
| 12,204,591 | B1 * | 1/2025 | Smith | G06F 16/9027 |
| 12,222,920 | B1 | 2/2025 | Zhang | |
| 2007/0050411 | A1 * | 3/2007 | Hull | G06F 16/434 |
| 2008/0141117 | A1 * | 6/2008 | King | G06F 16/93 714/48 |
| 2011/0103699 | A1 * | 5/2011 | Ke | G06F 16/58 382/209 |

(Continued)

OTHER PUBLICATIONS

U.S. Appl. No. 18/067,623, filed Dec. 16, 2022, Shaokang Ni, et al.

(Continued)

*Primary Examiner* — Eliyah S. Harper
(74) *Attorney, Agent, or Firm* — Alexander A. Knapp; Kowert, Hood, Munyon, Rankin & Goetzel, P.C.

(57) ABSTRACT

A hybrid serverless computing and durable computing search system provides low-latency search by maintaining domain specific search indices in memory or storage, while also allowing for low-cost service by scaling to zero when not in use. An initial search query is processed by an ephemeral computing instance loaded with code for executing search and which has downloaded relevant search indexes for a given domain. Asynchronously, a longer-lived container is launched and loaded with the relevant search indices. Subsequent search queries for the given domain are handled using the container without the delay associated with downloading the relevant search indices. After a period of inactivity both the container and ephemeral computing instances are scaled to zero.

20 Claims, 33 Drawing Sheets

(56) References Cited

U.S. PATENT DOCUMENTS

| | | | | |
|---|---|---|---|---|
| 2011/0106782 | A1* | 5/2011 | Ke | G06F 16/5838 707/E17.02 |
| 2014/0279825 | A1* | 9/2014 | Shukla | G06F 16/93 707/634 |
| 2017/0041296 | A1* | 2/2017 | Ford | G06F 21/64 |
| 2017/0213127 | A1* | 7/2017 | Duncan | G16B 50/30 |
| 2017/0235848 | A1* | 8/2017 | Van Dusen | G06Q 10/10 705/12 |
| 2018/0300290 | A1* | 10/2018 | Klein | G06F 40/103 |
| 2022/0005253 | A1* | 1/2022 | Domshy | G06F 11/3692 |
| 2025/0173363 | A1* | 5/2025 | Madisetti | G06F 40/30 |
| 2025/0190461 | A1* | 6/2025 | Madisetti | G06F 40/284 |

OTHER PUBLICATIONS

U.S. Appl. No. 18/066,950, filed Dec. 15, 2022, Sushang Bhatia, et al.
U.S. Appl. No. 19/095,812, filed Mar. 31, 2025, John Espenhahn, et al.
U.S. Appl. No. 19/095,838, filed Mar. 31, 2025, Ali Koc, et al.
U.S. Appl. No. 19/095,855, filed Mar. 31, 2025, Nitya Dhimantkumar Sheth, et al.

* cited by examiner

Attribute Translator 802
First Attribute: 000...0
Second Attribute: 100...0
Third Attribute: 010...0
Fourth Attribute: 110...0
Fifth Attribute: 001...0
Sixth Attribute: 101...0
Seventh Attribute: 011...0
Eighth Attribute: 111...0
...
Kth Attribute: 111...1

Data Item Translator 800

| | First Bit Position: First Data Item | Second Bit Position: Second Data Item | Third Bit Position: Third Data Item | Fourth Bit Position: Fourth Data Item | Fifth Bit Position: Fifth Data Item | Sixth Bit Position: Sixth Data Item | Seventh Bit Position: Seventh Data Item | : | Mth Bit Position: Mth Data Item |
|---|---|---|---|---|---|---|---|---|---|
| Bitmap For First Binary Digit 804 | 1 | 1 | 0 | 1 | 1 | 0 | 1 | ... | 1 |
| Bitmap For Second Binary Digit 806 | 0 | 0 | 1 | 1 | 0 | 0 | 1 | ... | 1 |
| Bitmap For Third Binary Digit 808 | 1 | 0 | 1 | 0 | 1 | 1 | 1 | ... | 0 |
| ... | | | | | | | | | |
| Bitmap For Nth Binary Digit 810 | 0 | 0 | 0 | 0 | 0 | 0 | 0 | ... | 0 |

FIG. 8

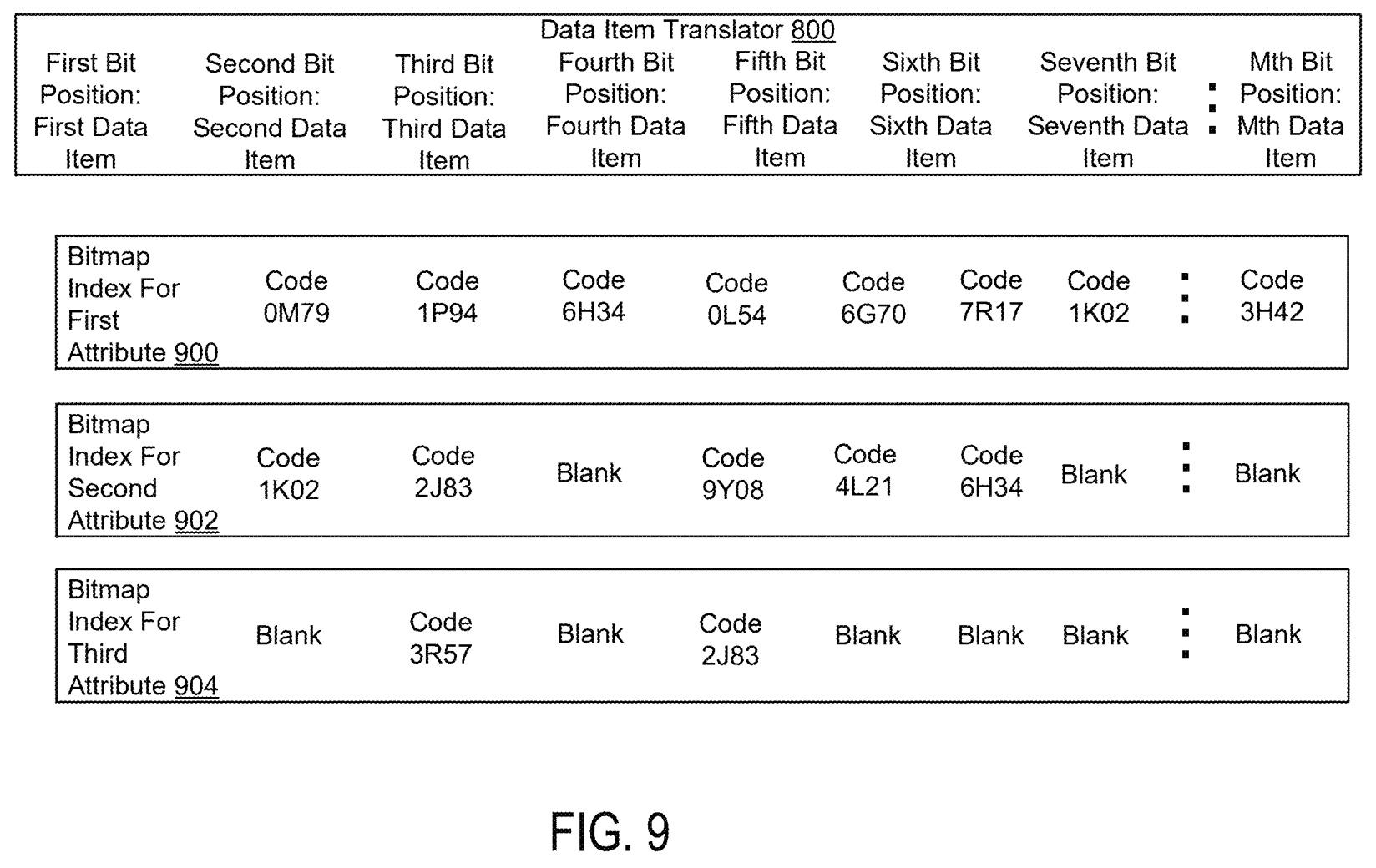

Data Item Translator 800

| | First Bit Position: First Data Item | Second Bit Position: Second Data Item | Third Bit Position: Third Data Item | Fourth Bit Position: Fourth Data Item | Fifth Bit Position: Fifth Data Item | Sixth Bit Position: Sixth Data Item | Seventh Bit Position: Seventh Data Item | ... | Mth Bit Position: Mth Data Item |
|---|---|---|---|---|---|---|---|---|---|
| Bitmap Index For First Attribute 900 | Code 0M79 | Code 1P94 | Code 6H34 | Code 0L54 | Code 6G70 | Code 7R17 | Code 1K02 | ... | Code 3H42 |
| Bitmap Index For Second Attribute 902 | Code 1K02 | Code 2J83 | Blank | Code 9Y08 | Code 4L21 | Code 6H34 | Blank | ... | Blank |
| Bitmap Index For Third Attribute 904 | Blank | Code 3R57 | Blank | Code 2J83 | Blank | Blank | Blank | ... | Blank |

FIG. 9

Attribute Translator 1000

First Attribute: 00

Second Attribute: 10

Third Attribute: 01

Fourth Attribute: 11

Updated Attribute Translator 1002

First Attribute: 000

Second Attribute: 100

Third Attribute: 010

Fourth Attribute: 110

Fifth Attribute: 001

Sixth Attribute: 101

Seventh Attribute: 011

Eighth Attribute: 111

Obtain an inverted bitmap index and processing instructions for using the inverted bitmap index 1210

Determine a binary value for an attribute to be used to filter the inverted bitmap index 1212

Perform one or more logical operations on bitmaps of the inverted bitmap index to identify data items associated with the attribute 1214

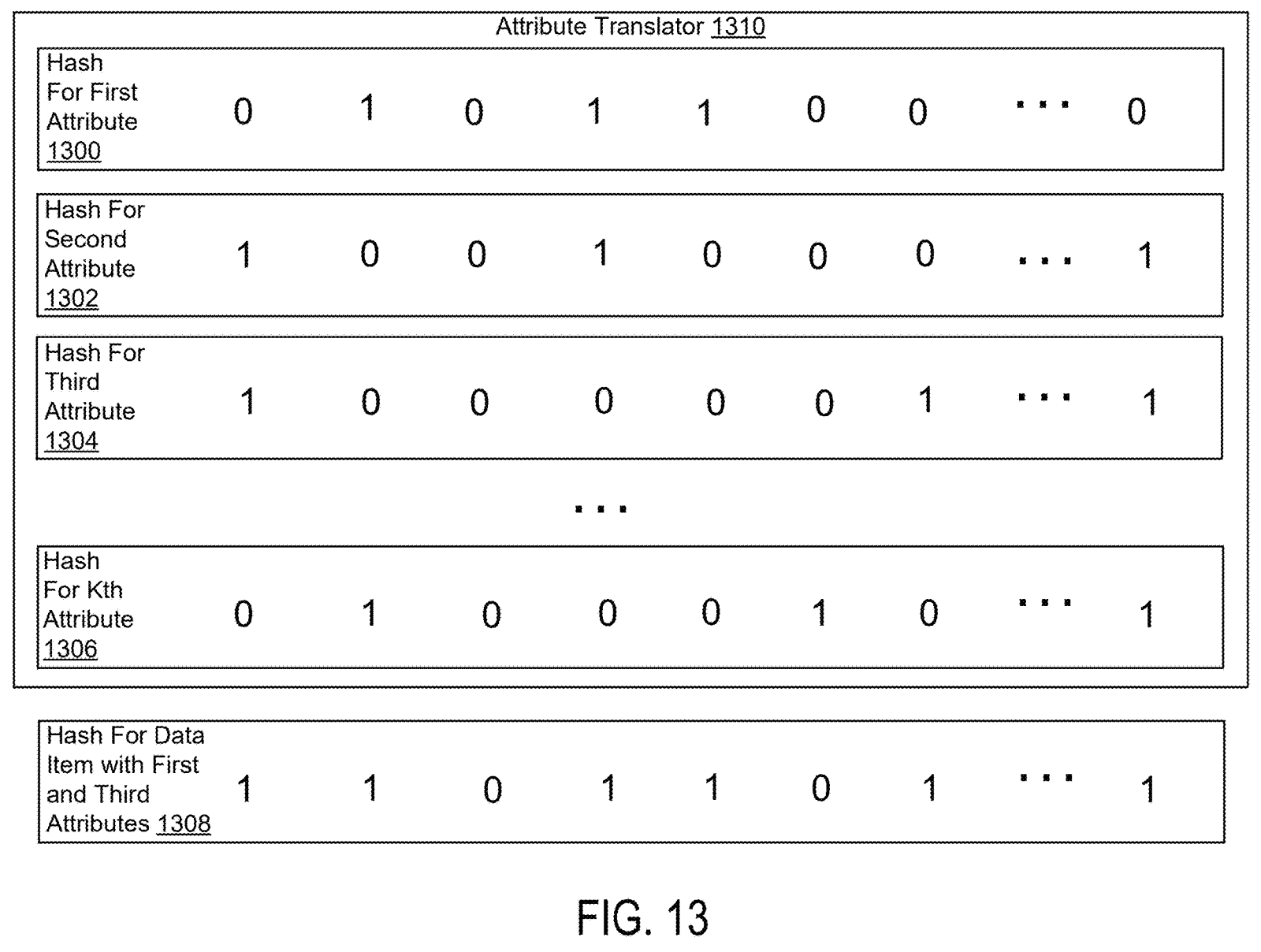

Attribute Translator 1310

Hash For First Attribute 1300 0 1 0 1 1 0 0 ... 0

Hash For Second Attribute 1302 1 0 0 1 0 0 0 ... 1

Hash For Third Attribute 1304 1 0 0 0 0 0 1 ... 1

...

Hash For Kth Attribute 1306 0 1 0 0 0 1 0 ... 1

Hash For Data Item with First and Third Attributes 1308 1 1 0 1 1 0 1 ... 1

FIG. 13

Data Item Translator 1400

| | First Bit Position: First Data Item | Second Bit Position: Second Data Item | Third Bit Position: Third Data Item | Fourth Bit Position: Fourth Data Item | Fifth Bit Position: Fifth Data Item | Sixth Bit Position: Sixth Data Item | Seventh Bit Position: Seventh Data Item | ... | Mth Bit Position: Mth Data Item |
|---|---|---|---|---|---|---|---|---|---|
| Bitmap For First Hash Position 1402 | 1 | 1 | 0 | 0 | 1 | 0 | 1 | ... | 0 |
| Bitmap For Second Hash Position 1404 | 1 | 0 | 1 | 1 | 0 | 1 | 0 | ... | 1 |
| Bitmap For Third Hash Position 1406 | 0 | 1 | 0 | 0 | 1 | 0 | 0 | ... | 1 |
| ... | | | | | | | | | |
| Bitmap For Nth Hash Position 1408 | 1 | 1 | 0 | 1 | 0 | 1 | 0 | ... | 0 |

FIG. 14

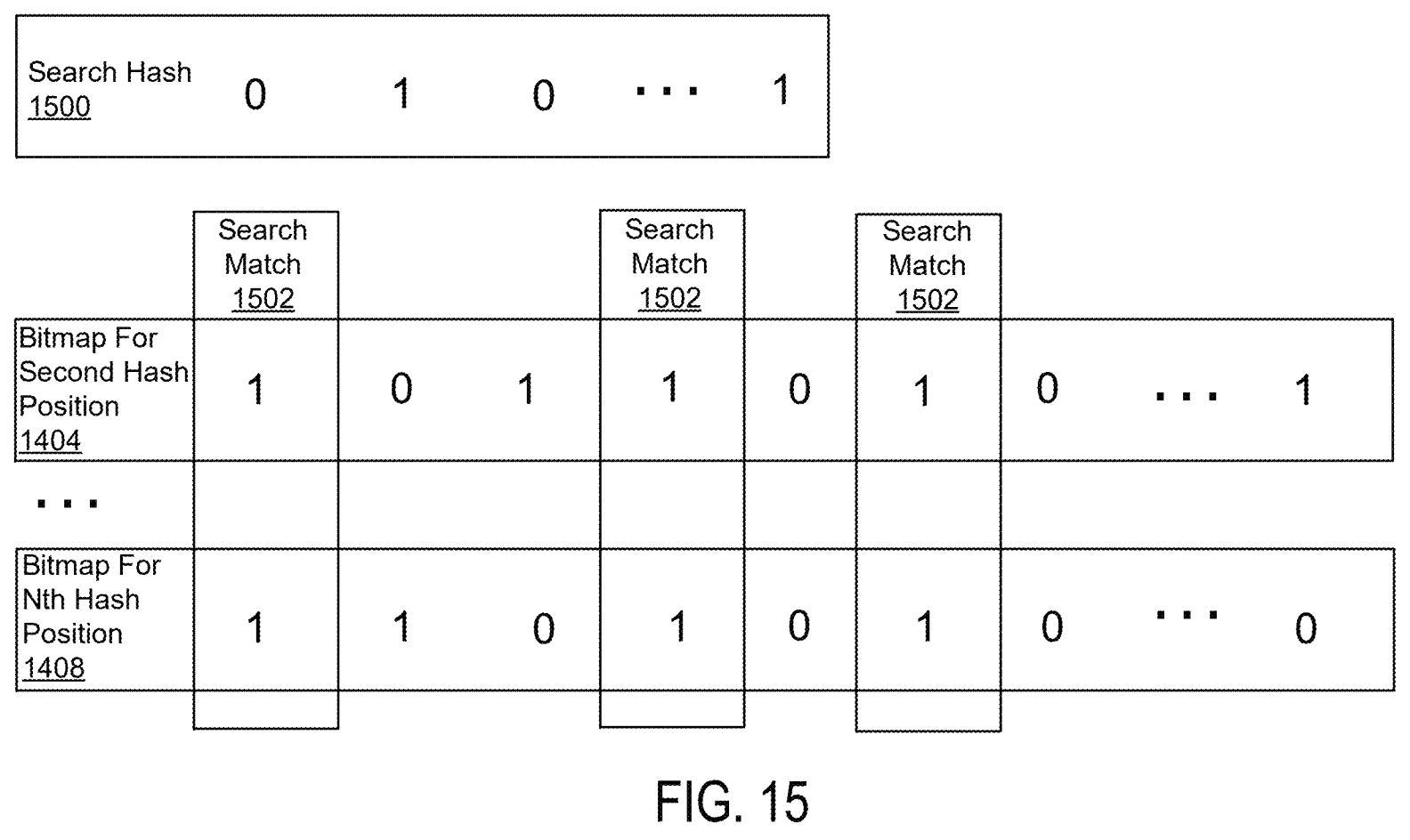

Search Hash 1500
0 1 0 ... 1

Search Match 1502
Search Match 1502
Search Match 1502

Bitmap For Second Hash Position 1404
1 0 1 1 0 1 0 ... 1

...

Bitmap For Nth Hash Position 1408
1 1 0 1 0 1 0 ... 0

FIG. 15

| | | | | | | | | | |
|---|---|---|---|---|---|---|---|---|---|
| Vector 1800 | -0.29 | 0.73 | 5 | -3.2 | 0.1 | -0.4 | -1.2 | ⋮ | 0.3 |
| Dimension Average 1802 | -0.21 | 0.54 | 5 | -2.5 | .7 | -0.8 | -1.4 | ⋮ | 0.25 |
| Binary Vector 1804 | 0 | 1 | 0 | 0 | 0 | 1 | 1 | ⋮ | 0 |

FIG. 18

Data Item Translator 1900

| | First Bit Position: First Data Item | Second Bit Position: Second Data Item | Third Bit Position: Third Data Item | Fourth Bit Position: Fourth Data Item | Fifth Bit Position: Fifth Data Item | Sixth Bit Position: Sixth Data Item | Seventh Bit Position: Seventh Data Item (Search Match 1912) | ... | Mth Bit Position: Mth Data Item |
|---|---|---|---|---|---|---|---|---|---|
| Bitmap For First Dimension 1904 | 0 | 1 | 0 | 0 | 1 | 0 | 1 | ... | 0 |
| Bitmap For Second Dimension 1906 | 1 | 0 | 0 | 1 | 0 | 0 | 0 | ... | 1 |
| Bitmap For Third Dimension 1908 | 1 | 0 | 1 | 0 | 0 | 0 | 1 | ... | 1 |
| ... | | | | | | | | | |
| Bitmap For Nth Dimension 1910 | 0 | 1 | 0 | 0 | 0 | 1 | 0 | ... | 1 |

Search Binary Vector 1902: 1, 0, 1, ..., 0

FIG. 19

| | | | | | | | | | |
|---|---|---|---|---|---|---|---|---|---|
| Search Vector 2000 | 0.46 | -1.4 | 0.9 | -3.2 | 0.1 | -0.4 | -1.2 | ... | 0.3 |
| Vector For Best Match 2002 | 0.29 | -0.73 | 2.7 | -2.8 | 0.5 | 0.89 | 0 | ... | 1.9 |
| Vector For Second Best Match 2004 | 0.53 | 2.2 | -3.6 | -2.5 | .7 | -0.8 | -1.2 | ... | 2.3 |
| Vector For Third Best Match 2006 | -0.26 | 11 | 0.78 | 0.64 | -1 | 0.67 | -0.78 | ... | 1.4 |

FIG. 20

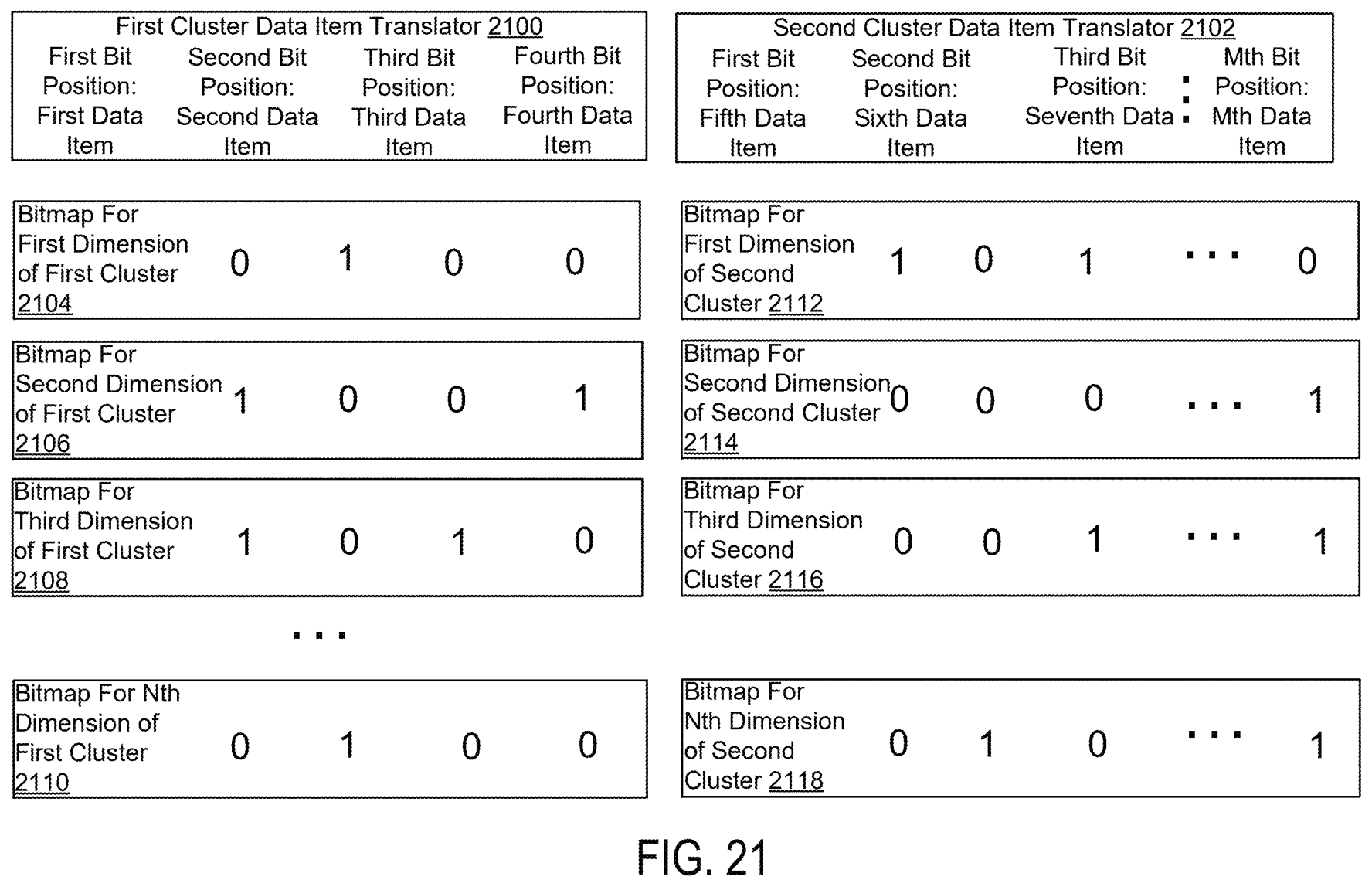

First Cluster Data Item Translator 2100

| | First Bit Position: First Data Item | Second Bit Position: Second Data Item | Third Bit Position: Third Data Item | Fourth Bit Position: Fourth Data Item |
|---|---|---|---|---|
| Bitmap For First Dimension of First Cluster 2104 | 0 | 1 | 0 | 0 |
| Bitmap For Second Dimension of First Cluster 2106 | 1 | 0 | 0 | 1 |
| Bitmap For Third Dimension of First Cluster 2108 | 1 | 0 | 1 | 0 |
| ... | | | | |
| Bitmap For Nth Dimension of First Cluster 2110 | 0 | 1 | 0 | 0 |

Second Cluster Data Item Translator 2102

| | First Bit Position: Fifth Data Item | Second Bit Position: Sixth Data Item | Third Bit Position: Seventh Data Item | ... | Mth Bit Position: Mth Data Item |
|---|---|---|---|---|---|
| Bitmap For First Dimension of Second Cluster 2112 | 1 | 0 | 1 | ... | 0 |
| Bitmap For Second Dimension of Second Cluster 2114 | 0 | 0 | 0 | ... | 1 |
| Bitmap For Third Dimension of Second Cluster 2116 | 0 | 0 | 1 | ... | 1 |
| Bitmap For Nth Dimension of Second Cluster 2118 | 0 | 1 | 0 | ... | 1 |

FIG. 21

Data Item Translator 2500

| | First Bit Position: First Data Item | Second Bit Position: Second Data Item | Third Bit Position: Third Data Item | Fourth Bit Position: Fourth Data Item | Fifth Bit Position: Fifth Data Item | Sixth Bit Position: Sixth Data Item | Seventh Bit Position: Seventh Data Item (Search Match 2512) | ... | Mth Bit Position: Mth Data Item |
|---|---|---|---|---|---|---|---|---|---|
| Bitmap For First Hash Position 2504 | 0 | 1 | 0 | 0 | 1 | 0 | 1 | ... | 0 |
| Bitmap For Second Hash Position 2506 | 1 | 0 | 0 | 1 | 0 | 0 | 0 | ... | 1 |
| Bitmap For Third Hash Position 2508 | 1 | 0 | 1 | 0 | 0 | 1 | 1 | ... | 1 |
| ... | | | | | | | | | |
| Bitmap For Nth Hash Position 2510 | 0 | 1 | 0 | 0 | 0 | 0 | 0 | ... | 1 |

Search Hash 2502

Data Item Translator 2600

First Bit Position: First Data Item
Second Bit Position: Second Data Item
Third Bit Position: Third Data Item
Fourth Bit Position: Fourth Data Item
Fifth Bit Position: Fifth Data Item
Sixth Bit Position: Sixth Data Item
Seventh Bit Position: Seventh Data Item
. . .
Mth Bit Position: Mth Data Item Best Result 2608

| | | | | | | | | | |
|---|---|---|---|---|---|---|---|---|---|
| Hamming Distance For First Hash Set 2602 | 3 | 2 | 4 | 1 | 1 | 1 | 1 | . . . | 2 |
| Hamming Distance For Second Hash Set 2604 | 4 | 2 | 7 | 1 | 1 | 0 | 1 | . . . | 0 |
| Hamming Distance For Third Hash Set 2606 | 8 | 3 | 5 | 3 | 0 | 0 | 3 | . . . | 1 |

FIG. 26

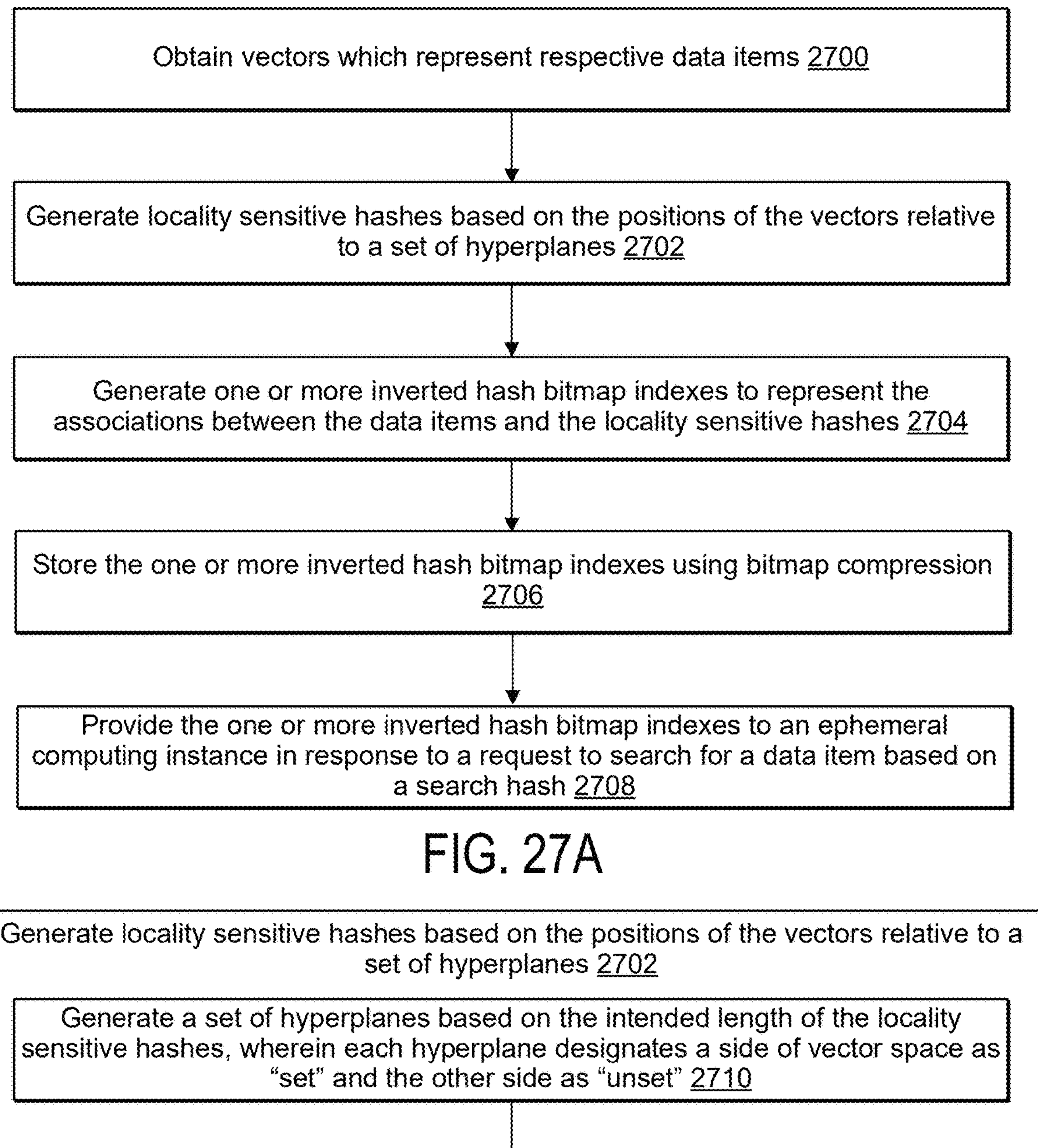

FIG. 27A

Generate locality sensitive hashes based on the positions of the vectors relative to a set of hyperplanes 2702

Generate a set of hyperplanes based on the intended length of the locality sensitive hashes, wherein each hyperplane designates a side of vector space as "set" and the other side as "unset" 2710

For each vector, determine the vector's position relative to the "set" and "unset" sides of each of the hyperplanes 2712

Generate the locality sensitive hashes based on the determined positions of the vectors relative to the hyperplanes 2714

FIG. 27B

HYBRID SERVERLESS COMPUTING AND DURABLE COMPUTING SEARCH SERVICE

BACKGROUND

Cloud computing services may handle large amounts of data items which customers may need to access. Searching the data items directly or performing nearest neighbor searches of full vectors associated with the data items may be time consuming and may require a significant amount of compute processing resources. Also, maintaining dedicated computing resources for all search domains, even when not being used for search, may be costly to maintain.

BRIEF DESCRIPTION OF THE DRAWINGS

FIG. 8 is a bit array illustrating how a set of bitmaps may be used as an inverted index to encode a large number of binary values associated with attributes for a large number of data items and how translators may be used to effectively use the set of bitmaps to search the data items according to the attributes, according to some embodiments.

FIG. 9 is a block diagram illustrating how multiple attributes of any particular data item may be stored using multiple inverted indexes, according to some embodiments.

FIG. 13 is a bit array illustrating how hashes for attributes of a probabilistic inverted bitmap index may be used to generate hashes for data items of the probabilistic inverted bitmap index, according to some embodiments.

FIG. 14 is a bit array illustrating how hashes for data items may be arranged to generate a probabilistic inverted bitmap index, according to some embodiments.

FIG. 15 is a bit array illustrating how a search hash may be used to probabilistically search the data items according to an attribute or set of attributes, according to some embodiments.

FIG. 18 is a block diagram illustrating how a binary vector can be generated based on a full vector, according to some embodiments.

FIG. 19 is a bit array illustrating how a vector-based inverted bitmap index can be searched using a search binary vector, according to some embodiments.

FIG. 20 is a block diagram illustrating a possibility for re-ranking a set of apparent nearest neighbor vectors based on full vectors rather than binary vectors, according to some embodiments.

FIG. 21 is a bit array illustrating how a vector-based inverted bitmap index can be divided into clusters, resulting in multiple smaller vector-based inverted bitmap indexes, according to some embodiments.

FIG. 25 is a bit array illustrating how a locality sensitive hash-based inverted bitmap index may be searched for data items which are associated with vectors which are potentially nearest neighbor vectors of a search vector, according to some embodiments.

FIG. 26 is a block diagram illustrating how Hamming distances as compared to search hashes of a search vector over a set of locality sensitive hash-based inverted bitmap indexes may be used to determine a best match data item for the search vector, according to some embodiments.

FIG. 27A is a flowchart illustrating how a locality sensitive hash-based inverted bitmap index is made available to be used in a data item filtering process, according to some embodiments.

FIG. 27B is a flowchart illustrating how locality sensitive hashes to be included in locality sensitive hash-based inverted bitmap indexes can be generated, according to some embodiments.

Figure 1:
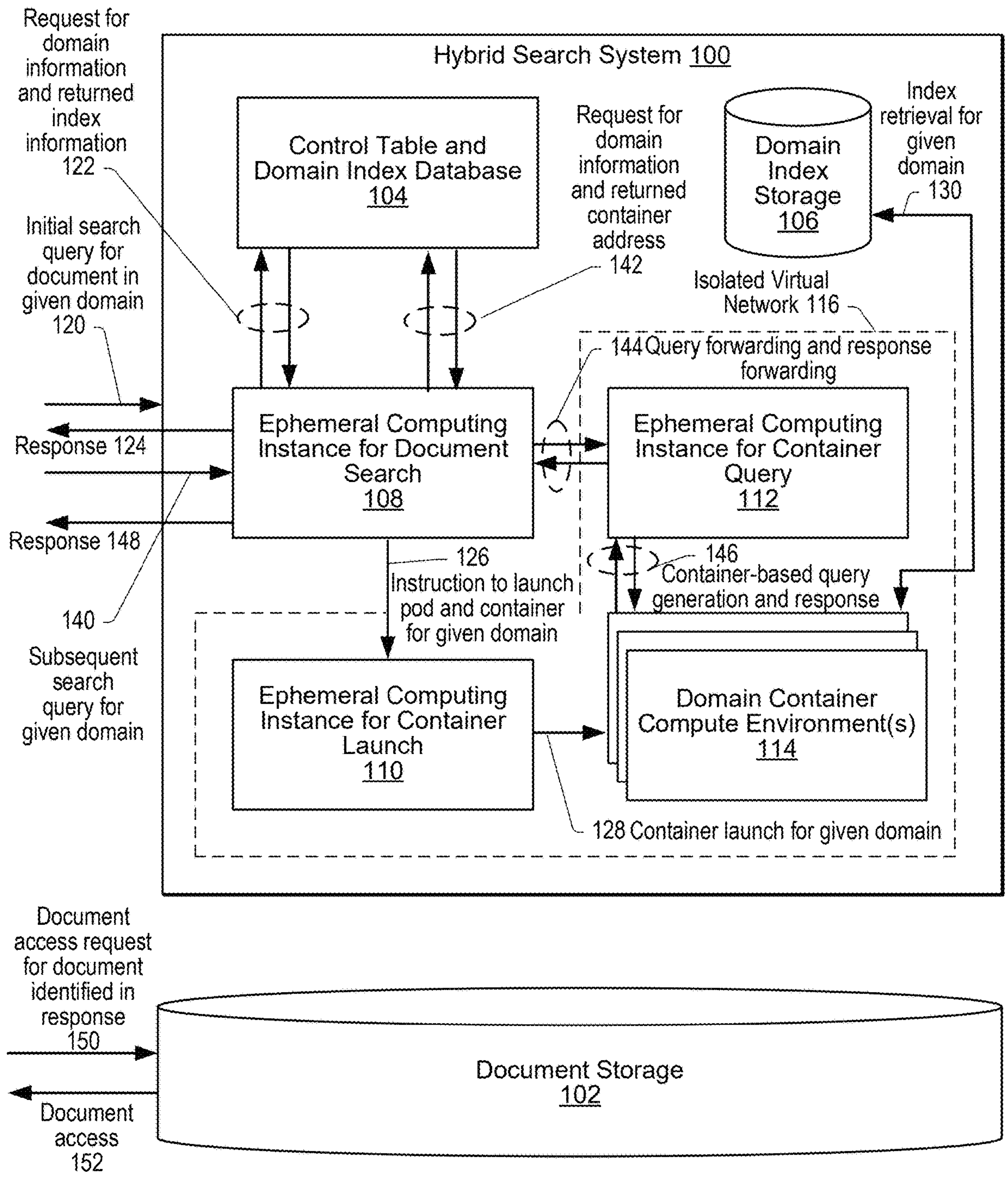
FIG. 1 is a block diagram illustrating a hybrid search system that utilizes ephemeral computing instances and a containerized-computing environment to perform data item search, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

Customers of a cloud-computing service store a large number of records, documents, and/or other data items in the cloud-computing service. Searching the full corpus of such a large number of data items stored in the cloud-computing service for a respective customer can be time consuming. In some instances, indexes may be used to improve search latency and accuracy, but due to the large number of records and domains to which the records belong, such index files may also be large, making them time consuming to manage. One approach to performing such a search could be to instantiate a computing resource and load the computing resource with all index files to perform the search. However, this approach may be costly as the computing resource may need to be maintained in an active state, even when not performing searches, or may be slow, for example, if the compute instance is ephemeral and the index files need to be re-loaded to the computing instance, or a newly instantiated compute instance, prior to a search.

Hybrid Search System

To address these issues, a hybrid search system that utilizes a combination of ephemeral and non-ephemeral computing instances to perform data item search may be used. In such embodiments, index files for respective domains of data items can be stored in a control table and domain index database. Such index files may also be stored in domain index storage. Upon receiving an initial query for a given domain, a limited subset of the index files that are specific to the given domain may be retrieved from the control table and domain index database. To provide the computing capacity needed to perform the search, an ephemeral (e.g. serverless) computing instance can be instantiated (e.g. a "search" ephemeral computing instance) and the sub-set of index files specific to the given domain can be added to the memory of the ephemeral computing instance. The ephemeral computing instances may, for example, be a function execution environment, that executes a given function (e.g. search using a sub-set of index files added to memory) in response to an initiating trigger and may be short-lived such that the ephemeral computing instance are terminated once the search, or a group of searches, that caused it to be instantiated is completed. The ephemeral computing instances can be contrasted with dedicated or reserved computing instances that are provided to a given customer or internal service for a fixed reservation period, for example, for hours, days, or weeks, as opposed to seconds or minutes as could be the case for ephemeral computing instances.

In some embodiments, the hybrid search system, in response to receiving the initial query for the given domain, additionally causes a containerized execution environment to be launched for the given domain asynchronously with providing the query response to the initial query. Launching the containerized computing environment for the given domain can further comprise launching a pod of ephemeral computing instances that provide computing capacity to manage the launch of the containerized computing environment and further provide computing capacity to manage subsequent queries that are to be executed using the containerized computing environment. For example, a "launch" ephemeral computing instance may be configured to lunch the containerized computing environment using a container-based execution service of a cloud-service provider network.

Once the container is launched, the launch ephemeral computing instance may coordinate loading the containerized computing environment with index files for the given domain. For example, the "launch" ephemeral computing instance may retrieve relevant index files for the given domain from a domain index storage and upload the relevant index files into a local storage or memory of the containerized computing environment.

In some embodiments, another ephemeral computing instance included in the pod launched for the given domain is a "query execution" ephemeral computing instance that is configured to receive a query for the given domain and coordinate with the containerized computing environment to execute the query using the relevant index files. In some embodiments, the search and query execution functions may be implemented using a single ephemeral computing instance. Also, in some embodiments, the launch function may also be implemented using an ephemeral computing instance that performs one or more of the other functions, e.g. search or query execution.

In some embodiments, once the containerized computing environment is successfully launched and populated with index files for a given domain, the "launch" ephemeral computing instance may cause an entry in the control table and domain index database for the given domain to be updated. The update may add the network address of the containerized computing environment for the given domain to an entry associated with the given domain. Accordingly, when a subsequent query for the given domain is received, the search ephemeral computing instance can access the control table and domain index database for the latest index information for the given domain. Instead of receiving index files (as was the case for the initial query), the search ephemeral computing instance is returned a network address of the containerized execution environment for the given domain. In response the search ephemeral computing instance can pass the query and the network address for the containerized execution environment to the query execution ephemeral computing instance. The query execution ephemeral computing instance then connects to the containerized execution environment at the network address provided by the control table and domain index database and coordinates execution of the query in the containerized execution environment. Once a response is generated, it may be provided back to the customer, or the "query execution" ephemeral computing instance may pass the response back up to the "search" ephemeral computing instance to be provided as a search response to the customer.

In some embodiments, the data maintained in the cloud computing service for the customer may change frequently. To avoid the indices used in the containerized computing environment from becoming stale, the hybrid search system may instantiate two (or more) containerized execution environments for each given domain, for example a primary container and a secondary container. In such embodiments, a secondary container may be updated with new or modified index files while a primary container is being used to execute queries. The primary and secondary container may be swapped out periodically (e.g., upon occurrence of an event such as the number of updates applied to the secondary container or the passage of a specified amount of time), such that the secondary container with the most up-to-date indices becomes the primary container to be used for query execution, and at the same time, the formerly primary container becomes the secondary container, wherein while in the state of secondary container the indices loaded to the container are updated.

Also, in some situations, the demand for queries or the sizes of indices used for a given domain may change over time. In such a situation, the swapping of the primary and secondary containers, discussed above, may be utilized opportunistically to scale the processing and/or storage capacity of the containers. For example, if query volume has increased or is increasing, at "swap" out time, instead of shifting the current primary container to be the secondary container, the primary container may be shutdown after being transitioned to no longer being primary and replaced with an upgraded container that has more storage and/or more compute that will be the secondary container. The upgraded secondary container is then loaded with the most up-to-date indices for the given domain and eventually swapped back into the role of primary container. A similar process may be performed to provide a container with more storage capacity, for example if the size of the indices for the given domain is increasing. Additionally, similar processes may be used to scale down container compute capacity or container storage capacity.

Furthermore, the indices used for the search may be compressed and/or otherwise modified to improve search latency. For example, any of the inverted bitmap indices or other indices described herein may be used as the indices that are added to the memory of the "search" ephemeral computing instance for generating a query response for an initial request and/or may be used as the indices that are loaded to the containerized computing environment for generating responses to subsequent queries.

FIG. 1 is a block diagram illustrating a hybrid search system that utilizes ephemeral computing instances and a containerized-computing environment to perform data item search, according to some embodiments.

In some embodiments, hybrid search system 100 includes control table and domain index database 104, domain index storage 106, ephemeral computing instance for search 108 (e.g. "search" ephemeral computing instance 108), ephemeral computing instance for container launch 110 (e.g. "launch" ephemeral computing instance 110), ephemeral computing instance for container query 112 (e.g. "query execution" ephemeral computing instance 112), and domain containerized execution computing environments 114 (e.g. "containers" 114). Additionally, documents may be stored in document storage 102. It will be appreciated that, while documents are specifically discussed for the sake of illustration, other data items may be utilized in addition to, or in place of, documents.

In some embodiments, the domain indices stored in control table and domain index database 104 and domain index storage 106, may include indices organized based on characteristics of documents stored in document storage 102. For example, a customer may issue a search query asking for documents having particular characteristics and the hybrid search system 110 may generate a search response that identifies relevant documents stored in document storage 102 that have the characteristics that were the basis of the search. For example, a customer may issue a search for documents related to a particular business transaction, documents related to a particular project, etc., wherein the relation to the transaction or project manifest themselves as a particular characteristic of the document. For example, they may include references to a given transaction or may include terminology used in a particular project. In some embodiments, the hybrid search system 110 may return an address location or other identifier (e.g. key value of a key-value database, or graphical node of a graph database) at which the relevant documents may be accessed.

In some embodiments, hybrid search system 110 may alternatively return the relevant documents to the user, for example by retrieving the relevant documents from document storage 102 based on the query response. Note that in some embodiments a user may be a data processing application that is directed to perform searches.

For example, at 120 an initial search query for a given document is received at the hybrid search system 100. In response, "search" ephemeral computing instance 108 is instantiated. At 122, "search" ephemeral computing instance 108 queries database 104 for domain index information for a given domain implicated by the initial search request (or multiple domains implicated by the search request). In response, "search" ephemeral computing instance 108 receives the domain specific index information for the relevant domain(s) and adds the received domain index information to memory. The "search" ephemeral computing instance 108 then outputs response 124. As noted above, response 124 may include one or more identifiers for one or more documents that are responsive to the initial search query. These identifiers for the relevant documents (e.g. document name, key-value, node value of a graph, etc.) may then be used in document access request 150 to provide document access 152 to documents responsive to the initial query.

In addition to generating the response to the initial query, hybrid search system 100 asynchronously launches a domain container compute environment 114 for use in answering subsequent queries for the given domain (or domains) implicated by the initial query. For example, isolated virtual network 116 and ephemeral computing instances 110 and 112 are instantiated. This may be referred to as launching a "pod" of ephemeral computing instances. More specifically, at 126, "search" computing instance 108 provides a launch instruction to "launch" ephemeral computing instance 110. This causes "launch" ephemeral computing instance 110 to issue commands 128 to launch a containerized computing environment for a given domain (or domains) as instructed in the launch instruction 126. Also, "launch" ephemeral computing instance 110 coordinates loading index files (at 130) from the domain index storage into the launched domain container compute environment 114. In some embodiments, only a sub-set of the domain indices that are relevant to a given domain for which the container is being launched are loaded into the container. Also, "launch" ephemeral computing instance 110 updates control table and domain index database 104 to indicate a network address of the launched domain container compute environment 114 that has been launched for a given domain.

At 140 a subsequent search for the same domain is received at hybrid search system 100. At 142, "search" ephemeral computing instance 108 consults control table and domain index database 104 for indices or metadata for the given domain of the subsequent search and is returned the network address for the domain container compute environment 114 that was launched for that given domain in response to the initial request 120. At 144, the "search" ephemeral computing instance passes the query and container network address to "query execution" ephemeral computing instance 112. At 146, "query execution" ephemeral computing instance 112 coordinates a search for a response to the query using the indices that have been loaded into domain container compute environment 114 for the given domain. At 148, a query response is returned for the subsequent query. In some embodiments, "query execution" ephemeral computing instance 112 may directly provide the query response 148 to the customer or may pass the query results to "search" ephemeral computing instance 108, wherein "search" ephemeral computing instance 108 returns the query response to the customer. In a similar manner to the initial query, the generated results 148 for the subsequent query may then be included in document request 150 to provide a document access 152 to relevant documents that are responsive to the subsequent query.

In some embodiments, the ephemeral computing instances 108, 110, and 112 may be pre-empted or may otherwise be released once a given function execution, such as query search, launch, query execution coordination have been completed. In some embodiments, a container launched for a given domain may be kept active for only a threshold amount of time. If no additional queries are received prior to the threshold amount of time being reached, the container launched for the given domain may be shutdown. In the future, if another query is received for that given domain, another container may be launched and kept active for the threshold amount of time in order to provide lower latency search results for queries for that given domain. When, a container for a given domain is shutdown, the system may revert to handling a next query for that given domain as an initial query, which is handled by the "search" ephemeral computing instance 108, and which causes asynchronous launch of a container for that given domain. In some embodiments, the ephemeral computing instances scale to zero when not being used. For example, if a period of time passes without a search request, the respective ephemeral computing instances may be shutdown such that zero ephemeral computing instances are currently instantiated. When a next query is received, ephemeral computing instance 108 may be instantiated to answer the query and the process of launching a container for that given domain may be asynchronously invoked as described above.

Figure 2:
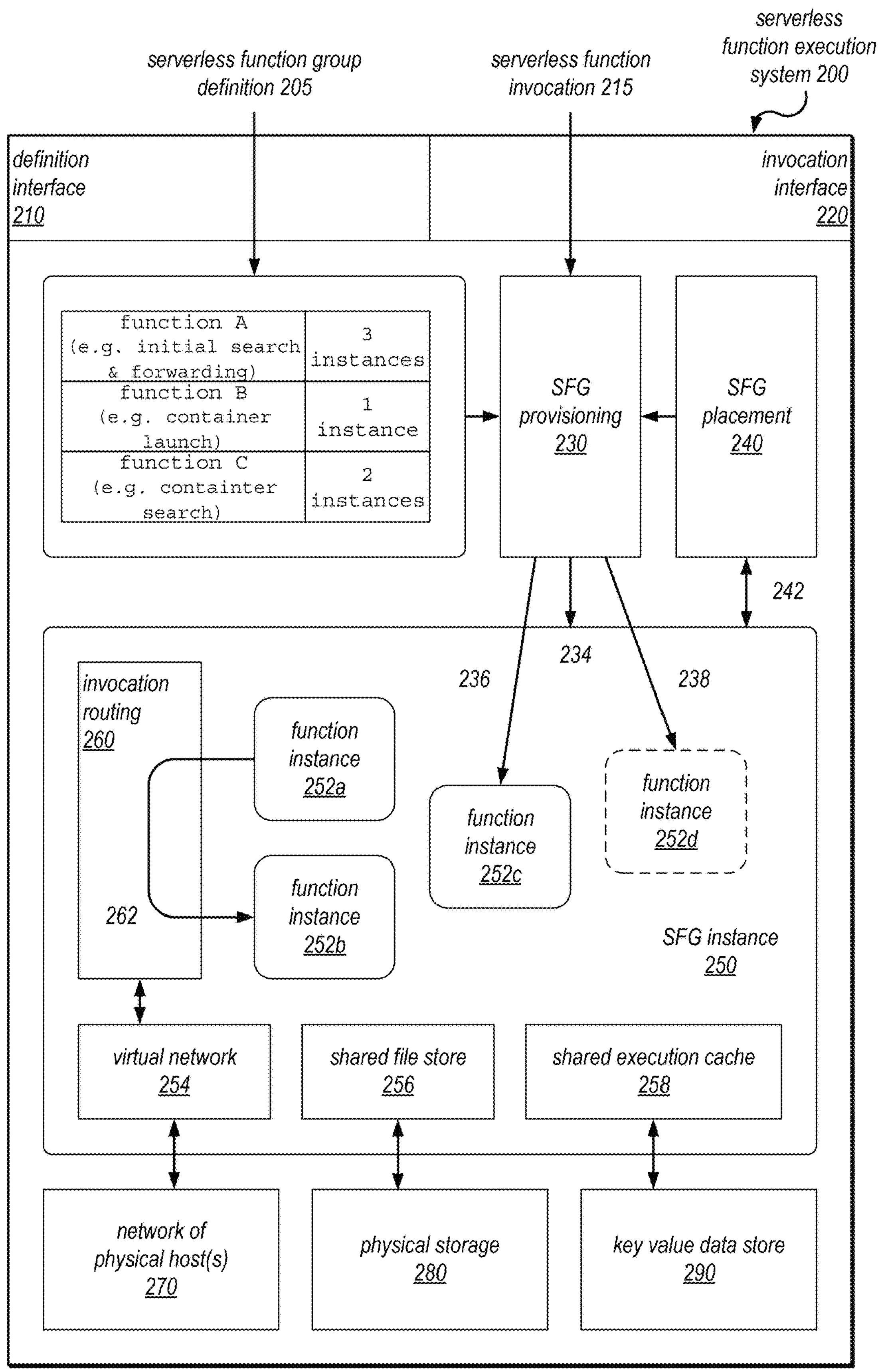
FIG. 2 is a block diagram illustrating a serverless function execution system (e.g. ephemeral computing system) that provides ephemeral computing instances for use by the hybrid search system, according to some embodiments.

FIG. 2 is a block diagram illustrating a serverless function execution system (e.g. ephemeral computing system) that provides ephemeral computing instances for use by the hybrid search system, according to some embodiments.

As shown, the figure depicts a serverless function execution ("SFE") system 200. The SFE system 200 is capable of storing code for performing various tasks, such as "search" code, "launch" code, "query execution coordination" code, etc. (e.g. custom serverless functions) and executing the functions using virtualized compute resources (e.g. virtual machines or containers) provided on an as-needed basis. As shown, the SFE system 200 provides a definition interface 210 to receive a serverless function group ("SFG") definition 205. The SFG definition 205 defines a group of serverless functions that belong to the SFG (here functions A, B, and C), and the number of instances of each serverless function to provision for the group. Depending on the embodiment, the SFG definition may indicate a minimum number of instances of a function type (e.g. instances that will be maintained during the lifetime of the SFG), a maximum number of instances of a function type (e.g. the maximum number of concurrent instances that the SFE system will provision to scale the SFG), or both a minimum and a maximum.

As shown, the SFE system 200 also provides an invocation interface 220 to receive serverless function invocations 215, such as an event triggering a serverless execution by the SFG or an invocation request (e.g. an initial or subsequent query, instruction to launch a containerized execution environment, instruction to coordinate query execution using a launched containerized execution environment, etc.). In response, the SFE system 200 uses a SFG provisioning component 230 to provision 234 an instance of the SFG 250 according to the SFG definition 205. The SFG provisioning component 230 may also be responsible for releasing or deprovisioning the SFG instance 250 when the SFG finishes the serverless execution (e.g. when all function instances in the SFG instance have completed execution). In some embodiments, the SFG provisioning component 230 will manage the life cycle of the provisioned SFG instance 250 as well as individual function instances 252*a-d* within the SFG instance during the serverless execution. For example, the SFG provisioning component may provision 236 a new function instance when it is needed during a serverless execution, and deprovision 238 an existing function instance when it is no longer needed. Provisioning a serverless function instance 252 may involve launching a virtual machine instance (or selecting a running virtual machine ("VM") instance from a pool) that is deployed with the code of the function. Provisioning the SFG instance 250 may entail provisioning the minimum number serverless function instances required by the SFG, as specified by the SFG definition 205.

As shown, the SFE system 200 implements a SFG placement component 240, which may be implemented as part of the SFG provisioning component 230 or a separate component (e.g. an independent service), depending on the embodiment. The SFG placement component 240 is tasked with selecting physical hardware resources (e.g. physical hosts) to host the SFG instance 250 and its serverless function instances 252*a-d*. For example, the physical server (s) used to initially provision the SFG instance 250 may be selected by the SFG placement component 240. The selection decision may be made based on a variety of factors such as internal policies associated with the SFE system, customer preferences (e.g. as indicated in the SFG definition 205), the current load of hosts in the SFE system, the geographic location that originated the invocation 215, etc. In some embodiments, as a default rule, the SFG placement component 240 will make a best effort attempt to provision an entire SFG instance, including all function instances and auxiliary resources, on a single physical host. This arrangement can simplify security control of the SFG, and improve data sharing among function instances of the SFG. In some embodiments, the SFG placement 240 may cause the SFG instance 250 or particular function instances 252 in the SFG to be migrated 242 to a different physical host. The migration may be performed based on performance data of the SFG instance monitored by the SFG placement component 240 (e.g. CPU or memory usage metrics of the physical host, data usage metrics, number of SFG instances on host). In some embodiments, a migration may occur as part of a standard housekeeping procedure of the SFE system 200, for example, to periodically rotate idle SFG instances among the physical hosts.

As shown, the SFG instance 250 is provisioned with a number of resources. In some embodiments, the function instances themselves 252 are provisioned as separate virtual machine instances hosted on physical VM host(s). The provisioning component 230 will connect the VM instances in a virtual network 254 in which each VM instance has a specific IP address. In this manner, the VM instances are able to communicate with one another over the virtual network 254, to enable function-to-function communications. The virtual network may be implemented as an overlay network on top of a substrate network connecting the underlying physical hosts 270, or within a single physical host, using software defined network (SDN) software or hardware.

In some embodiments, the virtual network 254 is used by an invocation routing component 260 to enable function-to-function invocations or calls 262 among function instances 252 in the SFG instance. Depending on the embodiment, the invocation routing component 260 may be implemented using resource(s) inside a SFG instance 250 (and e.g. a request queue provisioned and deprovisioned with the SFG instance), or longer-lasting resources outside the SFG instance. In some embodiments, each function instance 252 or VM instance may be deployed with a library that provides a programmatic interface (e.g. an API) that allows the function instance to invoke 262 other function instances 252. An invocation request may be directed to a type of function defined for the SFG (in which case the called function may be provisioned on demand), or a particular function instance already running in the SFG. In some embodiments, the invocation API does not require the caller to know the IP address associated with the callee. Rather, the invocation routing component 260 will handle the internal translation of the invocation to the appropriate IP address and dispatch the call to the called function instance.

In some embodiments, the SFG instance 250 will also include a shared file store 256, which can be used to store data files used by the function instances 252. This data store may be used as temporary file storage during the lifetime of the SFG instance, and spares the function instances 252 from having to individually download shared file data from external data sources. The shared file store 256 is part of the SFG instance 250 and is provisioned and deprovisioned with the SFG instance. In some embodiments, the shared file store 256 may be implemented using physical storage 280, such as a physical storage device that is local to the underlying physical host(s), or physical storage space provided by a network-based volume hosting service. The shared file store 256 may be provided as an attached volume of the VM instances executing the function instances 252. The volume may be provided with different access semantics such as a basic block-based access, a file system, or an object store API. In some embodiments, multiple file stores 256 may be provided to a single SFG instance 250, depending on the SFG definition 205.

In some embodiments, the SFG instance 250 may also include a shared execution cache 258, which can be used to store runtime execution data generated during the serverless execution. In some embodiments, the shared execution cache 258 may also be used to store other data such as environmental variables needed during the serverless execution. The shared execution cache 258 may be implemented as using a key-value data store 290, and may be implemented as an in-memory data store. In some embodiments, the key-value data store may be accessible as volatile memory in the VM instance via a direct memory access (DMA) interface. In other embodiments, the key-value store 290 may be implemented by an in-memory cache cluster. With the combination of the invocation routing component 260 and the shared execution cache 258, the SFE system allows the developers to implement a variety of custom communication protocols to support a variety of sophisticated serverless workloads.

Figure 3:
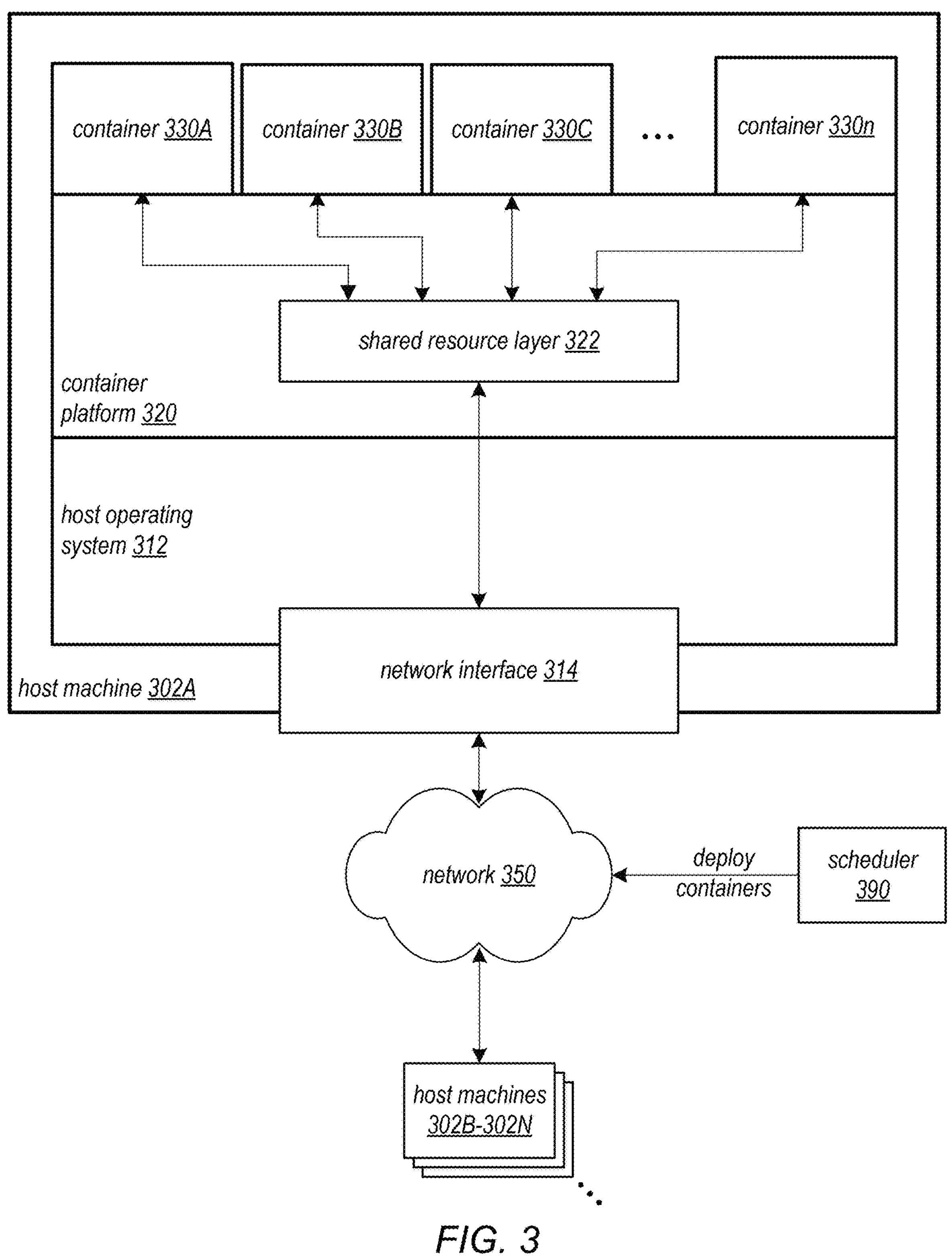
FIG. 3 is a block diagram illustrating a container-based execution system that provides containerized execution environments for use by the hybrid search system, according to some embodiments.

FIG. 3 is a block diagram illustrating a container-based execution system that provides containerized execution environments for use by the hybrid search system, according to some embodiments.

In some embodiments, a container-based execution system 300 as shown in FIG. 3 may provide the containers 114 described in FIG. 1. In some embodiments, container-based execution system 300 incudes several host machines (e.g. host machines 302A through 302N, as well as a network 350 and scheduler 390.

Figure 4:
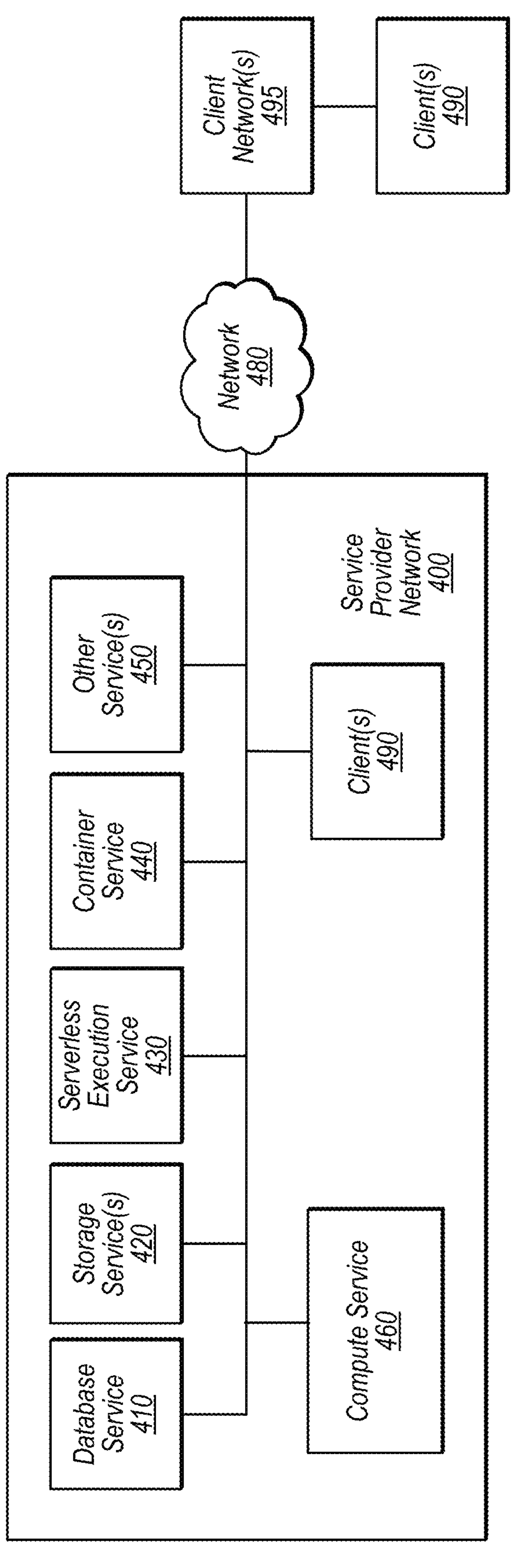
FIG. 4 is a block diagram illustrating a service provider network comprising services that may be used to use search techniques as described herein, according to some embodiments.

In some embodiments, a host machine 302A on network 350 may execute an operating system (OS) 312, for example a Microsoft Windows® or Linux® OS. The host machine 302A may be a physical machine, for example a host device on the network 350, or alternatively may be a virtual machine (VM) executing in a virtualization environment on a host device on the network 350. The network 350 may, for example, be a provider network as illustrated in FIG. 4.

A container platform 320, for example a Docker container platform, may execute on top of the host OS 312. The container platform 320 virtualizes the OS 312 in order for one or more containers 330A-330N to run on the single OS 312 instance. The host machine 310 and OS 312 may include one or more hardware and/or software resources (e.g., network interface 314 resources such as one or more network interface cards (NICs), processor resources, memory, storage, etc.) that are shared by the container(s) 330A-330*n* executing in the container-based virtualization environment provided by the container platform 320. By default, a container 330 has no resource constraints and can use as much of a given resource as the host OS 312 will allow. Thus, the container platform 320 may enforce resource constraints on the containers 330A-330N, for example via a shared resource layer 322 that orchestrates and arbitrates access to the host machine 310/OS 312 resources by the containers 330A-330N. For example, on a Linux OS 312, the shared resource layer 322 of container platform 320 may use Linux namespaces and cgroups to enforce resource constraints on containers 330A-330N.

A user, such as "launch" ephemeral computing instance 110, may submit an application to a scheduler 390 to be executed in a network 350 environment (e.g., a provider network). Scheduler 390 may, for example, be implemented as service on one or more computing devices coupled to network 350 that provides an application programming interface (API) and user interface via which users may access an embodiment of the container-based parallel computing system to submit their applications as container images for deployment to and execution on containers 330.

Scheduler 390 may obtain the container image directly from the user, or alternatively may obtain the container image from another location, for example a store of container images for different applications that are executable by the container-based execution system 300. Scheduler 390 may then locate one or more suitable host machines 310 on which the container is to be deployed, and deploy the container image to the host machine(s) 310 to be executed in the container-based virtualization environment provided by the container platform 320 on the host machine(s) 310.

FIG. 4 is a block diagram illustrating a service provider network comprising services that may be used to use search techniques as described herein, according to some embodiments.

Provider network 400 may be a private or closed system or may be set up by an entity such as a company or a public sector organization to provide one or more services (such as various types of cloud-based storage) accessible via the Internet and/or other networks to clients 490, in one embodiment. Provider network 400 may be implemented in a single location or may include numerous data centers hosting various resource pools, such as collections of physical and/or virtualized computer servers, storage devices, networking equipment and the like (e.g., computing system 2900 described below with regard to FIG. 29), needed to implement and distribute the infrastructure and services offered by the provider network 400, in one embodiment. In some embodiments, provider network 400 may implement various computing resources or services, such as database service 410, storage service(s) 420, serverless execution service 420 (e.g. serverless function execution system 200), container service 430 (e.g. container-based execution system 300), and/or any other type of network-based services 450 (which may include a virtual compute service 460 and various other types of storage, database or data processing, analysis, communication, event handling, visualization, etc.), in some embodiments.

In various embodiments, the components illustrated in FIG. 4 may be implemented directly within computer hardware, as instructions directly or indirectly executable by computer hardware (e.g., a microprocessor or computer system), or using a combination of these techniques. For example, the components of FIG. 4 may be implemented by a system that includes a number of computing nodes (or simply, nodes), each of which may be similar to the computer system embodiment illustrated in FIG. 29 and described below, in one embodiment. In various embodiments, the functionality of a given system or service component may be implemented by a particular node or may be distributed across several nodes. In some embodiments, a given node may implement the functionality of more than one service system component (e.g., more than one data store component).

Data storage service(s) 420 may implement different types of data stores for storing, accessing, and managing data on behalf of clients 490 as a network-based service that enables clients 490 to operate a data storage system in a cloud or network computing environment. Data storage service(s) 490 may also include various kinds relational or non-relational databases, such as implemented using database services 410, in some embodiments. Data storage service(s) 420 may include object or file data stores for putting, updating, and getting data objects or files, in some embodiments. Data storage service(s) 420 may be accessed via programmatic interfaces (e.g., APIs) or graphical user interfaces. Input data and output data may be put and/or retrieved from data storage service(s) 42230 via an interface for data storage services 420, in some embodiments. In some embodiments, control table and domain index database may be a database implemented using database service 410. Likewise, domain index storage 106 may be implemented using storage service 420. Additionally document storage 102 may be implemented using database service 410, storage service 420, or a combination thereof.

Generally speaking, clients 490 may encompass any type of client that can submit network-based requests to provider network 400 via network 480. For example, a given client 490 may include a suitable version of a web browser or may include a plug-in module or other type of code module that can execute as an extension to or within an execution environment provided by a web browser. In some embodiments, clients 490 may be connected to network 480 via client network 495. Alternatively, a client 490 may encompass an application (or user interface thereof), a media application, an office application or any other client application that may make use provider network 200 services to implement various applications, and may be located within service provider network 400, for example at a virtual machine allocated to the client. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 490 may be an application that can interact directly with provider network 400. In some embodiments, client 490 may generate network-based services requests according to a Representational State Transfer (REST)-style network-based services architecture, a document- or message-based network-based services architecture, or another suitable network-based services architecture.

In various embodiments, network 480 may encompass any suitable combination of networking hardware and protocols necessary to establish network-based communications between clients 490 and provider network 400. For example, network 480 may generally encompass the various telecommunications networks and service providers that collectively implement the Internet. Network 480 may also include private networks such as local area networks (LANs) or wide area networks (WANs) as well as public or private wireless networks, in one embodiment. For example, both a given client 490 and provider network 400 may be respectively provisioned within enterprises having their own internal networks. In such an embodiment, networks 480 and 495 may include the hardware (e.g., modems, routers, switches, load balancers, proxy servers, etc.) and software (e.g., protocol stacks, accounting software, firewall/security software, etc.) necessary to establish a networking link between given client 490 and the Internet as well as between the Internet and provider network 400. It is noted that in some embodiments, clients 490 may communicate with provider network 400 using a private network rather than the public Internet.

Figure 5A:
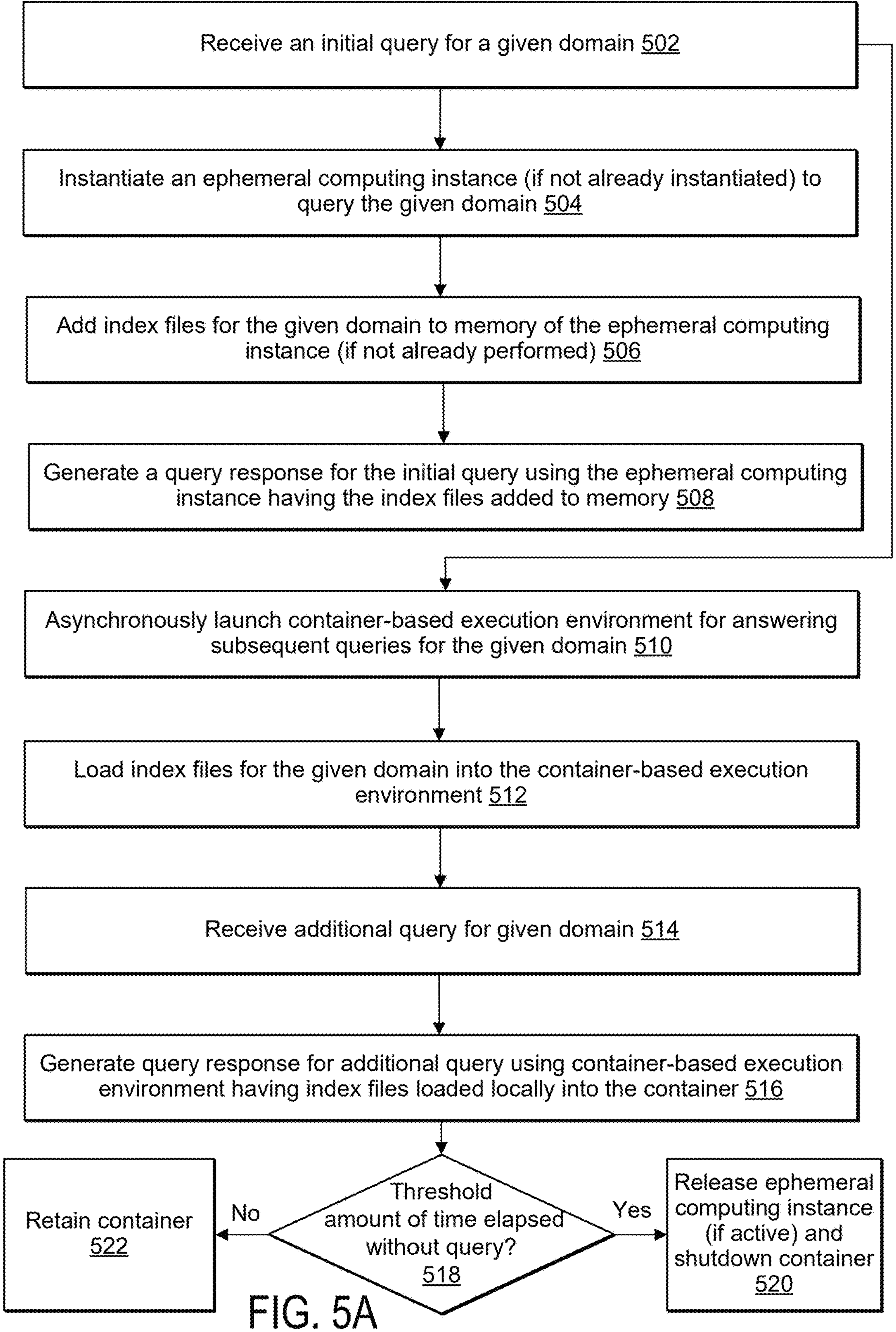
FIG. 5A is a flowchart illustrating a process for providing a hybrid search, according to some embodiments.

FIG. 5A is a flowchart illustrating a process for providing a hybrid serverless computing and durable computing document search, according to some embodiments.

At block 502, a hybrid search system receives an initial query for a given domain. For example, documents stored in a cloud-based service provider network, such as provider network 400, may have various characteristics, and these characteristics may belong to various domains. Indices may be generated for each domain and may improve search operations when searching for documents having characteristics belonging to a given domain for which one or more indices have been generated.

At block 504, in response to receiving the initial query for the given domain, an ephemeral computing instance (e.g. "search" ephemeral computing instance 108) is instantiated if not already active. At block 506, the instantiated ephemeral computing instance (if not already active) is loaded with index files retrieved from an index database, such as control table and domain index database 104. At block 508, a query response is generated by the instantiated ephemeral computing instance using function code loaded into the ephemeral computing instance (e.g. search code) and the indices added to the ephemeral computing instance at block 506.

Additionally, a container launch is initiated and performed asynchronously with performance of the query and generation of the query response. For example, at block 510 a container-based execution environment, such as a given one of the domain container compute environments 114, is launched. At block 512, the launched containerized execution environment is loaded with indices for the given domain. For example, indices for the given domain may be retrieved from domain index storage 106. Note that in comparison to the ephemeral computing instance used for search, the containerized execution environment provides durable storage of the domain specific indices and can be re-used to answer subsequent queries, even if the ephemeral search computing instance has been terminated in re-started between query executions.

At block 514, an additional query is received for the given domain and is routed by the "search" ephemeral computing instance to the "query execution" ephemeral computing instance. At block 516, the "query execution" ephemeral computing instance coordinates with the containerized execution environment for the given domain to generate a query response for the additional query.

At block 518, it is determined whether or not a threshold amount of time has elapsed without activity with regard to the containerized execution environment. If it is determine that the threshold amount of time has elapsed without activity, at block 520, the container is shutdown and the ephemeral computing instances instantiated for the given domain are released (if still active). If the threshold hast not been reached, then at block 522, the container is retained and is available for use for future queries for the given domain.

Figure 5B:
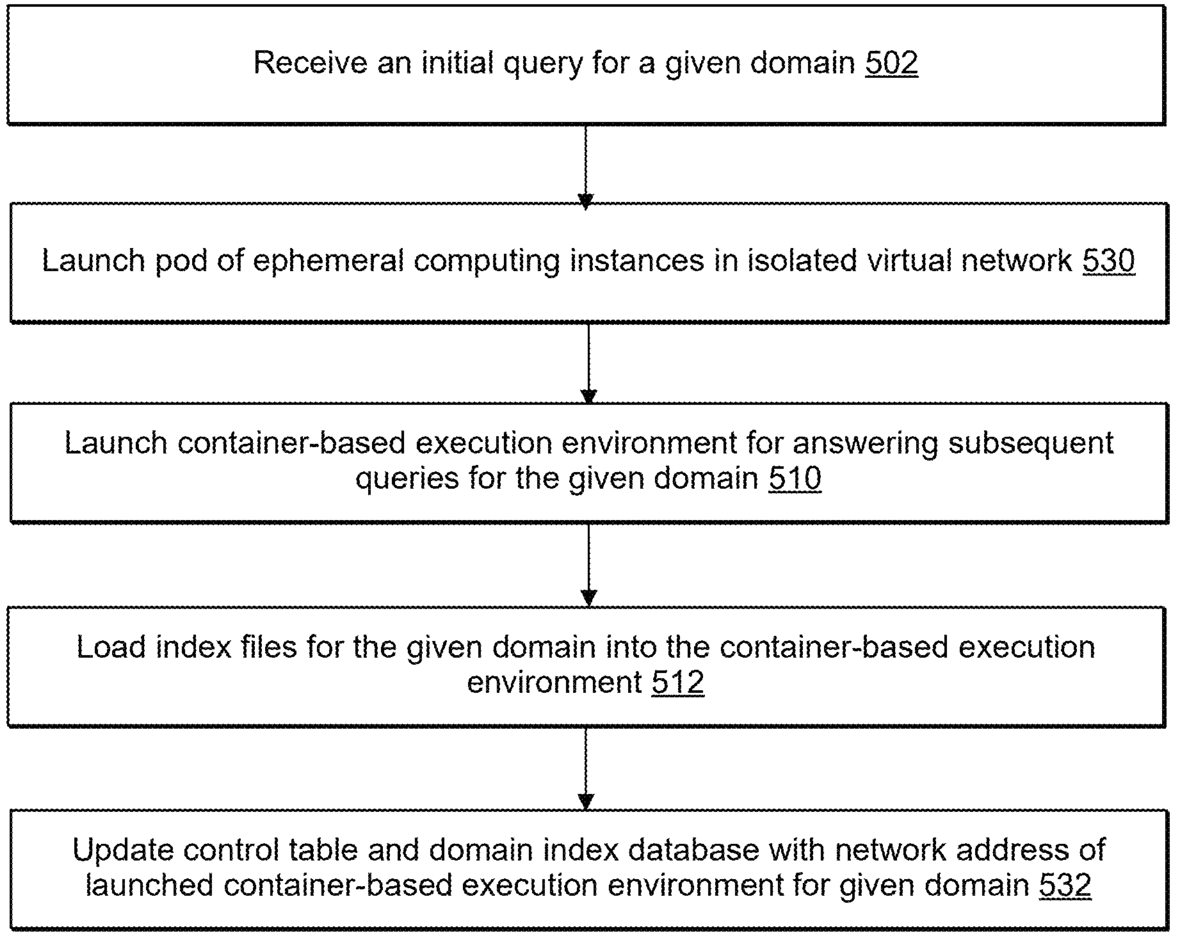
FIG. 5B is a flowchart illustrating additional details with regard to a process of launching a containerized computing environment for a hybrid search system, according to some embodiments.

FIG. 5B is a flowchart illustrating additional details with regard to a process of launching a containerized computing environment for a hybrid search system, according to some embodiments.

In some embodiments, between blocks 502 and 510 (as described in FIG. 5A) at block 530, a pod of ephemeral computing instances is launched in an isolated virtual network. For example, "launch" ephemeral computing instance 110 and "query execution" ephemeral computing instance 112 may be launched as a pod in isolated virtual network 116. Including the ephemeral computing instances in a pod may facilitate communications between the ephemeral computing instances.

Also, in some embodiments, subsequent to finishing the launch of the containerized execution environment at block 512, a control table (e.g. control table and domain index database 104) may be updated at block 532. The update may associate a network address of the containerized execution environment launched for the given domain with an entry in the database 104 for the given domain. This allows subsequent queries for the given domain to be directed to the appropriate container for that domain.

Figure 5C:
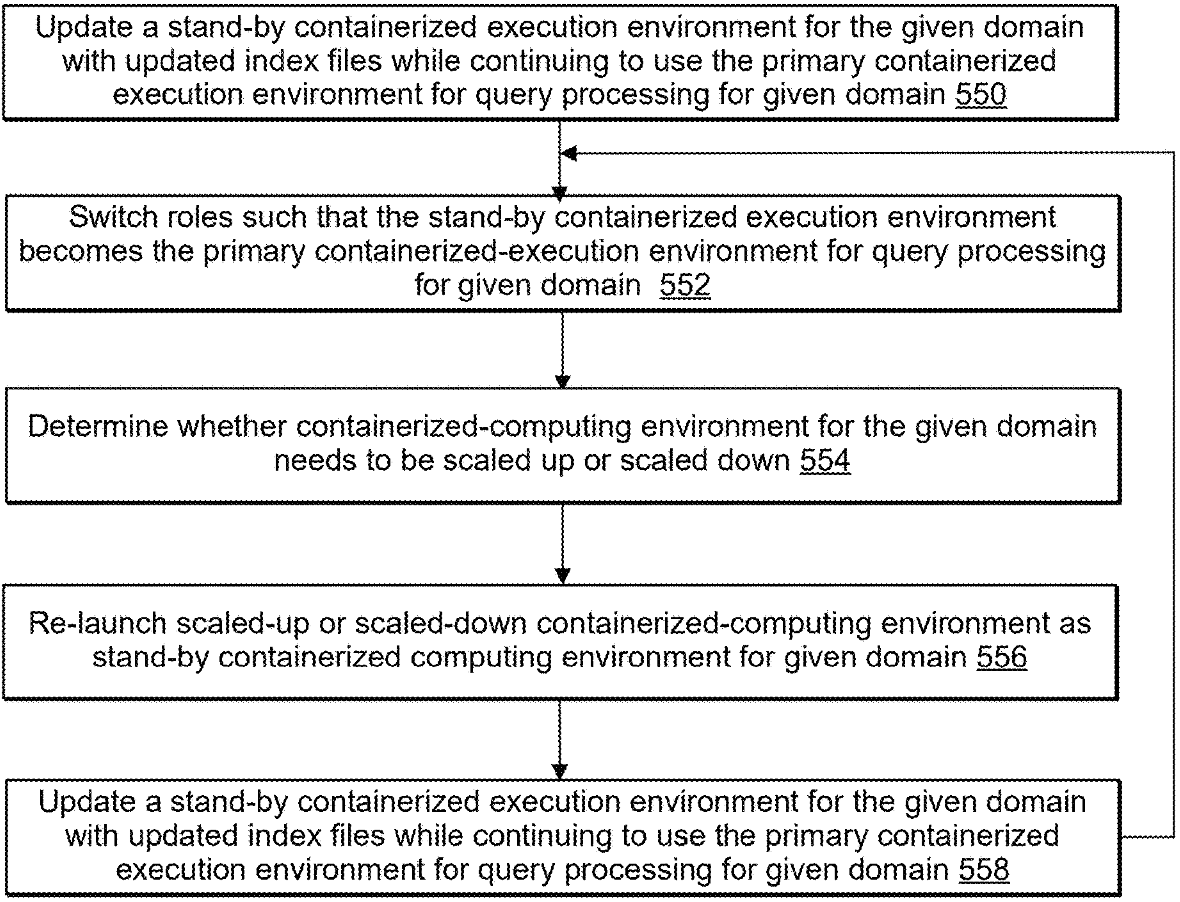
FIG. 5C is a flowchart illustrating additional details with regard to updating and scaling a containerized computing environment used by a hybrid search system, according to some embodiments.

FIG. 5C is a flowchart illustrating additional details with regard to updating and scaling a containerized computing environment used by a hybrid search system, according to some embodiments.

In some embodiments containers may be updated with new indices in the background and be swamped into use once updated. Similar techniques may be used to scale up or scale down containers.

At block 550, a stand-by containerized execution environment for a given domain is updated with index files while a primary containerized execution environment for the given domain is used to generate answers for queries.

At block 552, once the stand-by container has been updated, the roles of the primary and stand-by containerized environments are switched, such that the prior primary goes to stand-by and the prior stand-by containerized computing environment goes to primary. In this way the indices of the containers are updated without a loss of availability of the containers.

At block 554, it is determined whether or not the containerized execution environment form the given domain needs to be scaled-up or scaled-down. For example, the container may be scaled up or down to adjust an amount of computing capacity available. Also, as another example, the container may be scaled up or down to adjust an amount of storage capacity available. For example, a large volume of incoming queries may necessitate a scaling up of compute capacity. Also, an increase in the size or number of indices associated with a given domain may necessitate a scaling up of storage capacity.

At block 556, instead of converting a prior primary containerized computing environment to a stand-by containerized computing environment at an update interval (e.g. at 552), instead the prior primary containerized computing environment may be shutdown when the stand-by containerized computing environment is promoted to primary. At such a time, a new scaled up or scaled down standby containerized computing environment is launched. At block 558, the scaled up or scaled down stand-by containerized computing environment is then loaded with the most recently updated indices for the given domain.

Low Latency Data Search Using Inverted Bitmap Indexes

Clients may search for data items based on attributes of the data items and search vectors which are nearest neighbor vectors in vector-space to vectors associated with the data items. For searches of a large data set, for example a data set including more than a million data items, with a large amount of attributes, for example more than a thousand attributes, systems for performing the searches may be designed to minimize the storage and processing costs of the searches. An amount of attributes may be described as a cardinality, for example, a dataset with 200 attributes has a lower cardinality than a dataset with 500 attributes. Additionally, the systems for performing the searches may be designed to minimize the time and data requirements of transmission of information needed to perform the searches and to minimize the time requirements for performing the searches.

Inverted bitmap indexes may store a large amount of information in a compressible form, and may be relatively fast to send and search compared to other data storage techniques. An inverted bitmap index may include multiple bitmaps. A bitmap is a series of bits. A large amount of bits may be stored in a bitmap, and the bitmap may be compressed to reduce storage and transmission costs. Bit positions of a set of bitmaps may correspond to data items, and individual bitmaps may correspond to positions of a binary value, binary hash, or binary vector. The set of bitmaps in combination may be used to obtain a binary value, binary hash, or binary vector for an individual data item by taking the values stored at the bit position corresponding to the data item for each bitmap.

One or more of the embodiments described herein may be capable of achieving one or more of the following technical advantages. Embodiments may enable high cardinality datasets (e.g., more than 1 million attributes) to be searched with low latency (e.g., below 5 ms), and may enable information needed to search high cardinality datasets to be stored and used with low cost (e.g., less than 1 GB of data). Embodiments may further reduce the storage and use costs (e.g., below 15 MB of data) with probabilistic filtering with an error rate below 0.00001% with similar low latency (e.g., below 5 ms). Embodiments may similarly enable nearest neighbor vector searches to be performed with low cost on a large dataset (e.g., more than 1 million data items), and may enable information needed to search the large dataset to be stored and used with low cost (e.g., below 150 MB) with similar low latency (e.g., below 5 ms). Embodiments may similarly enable locality sensitive hash-based nearest neighbor searches to be performed with low cost on a large dataset (e.g., 10 million data items), and may enable the information needed to search the dataset to be stored and used with low cost (e.g., below 150 MB of data) with similar low latency (e.g., below 5 ms). Embodiments may reduce processing costs by using ephemeral computing instances, which may operate without a logical server and may thereby avoid processing costs associated with the logical server.

As used herein, "set," when used as an adjective, may mean "having a value of 1," and "unset" may mean "having a value of 0."

Figure 6A:
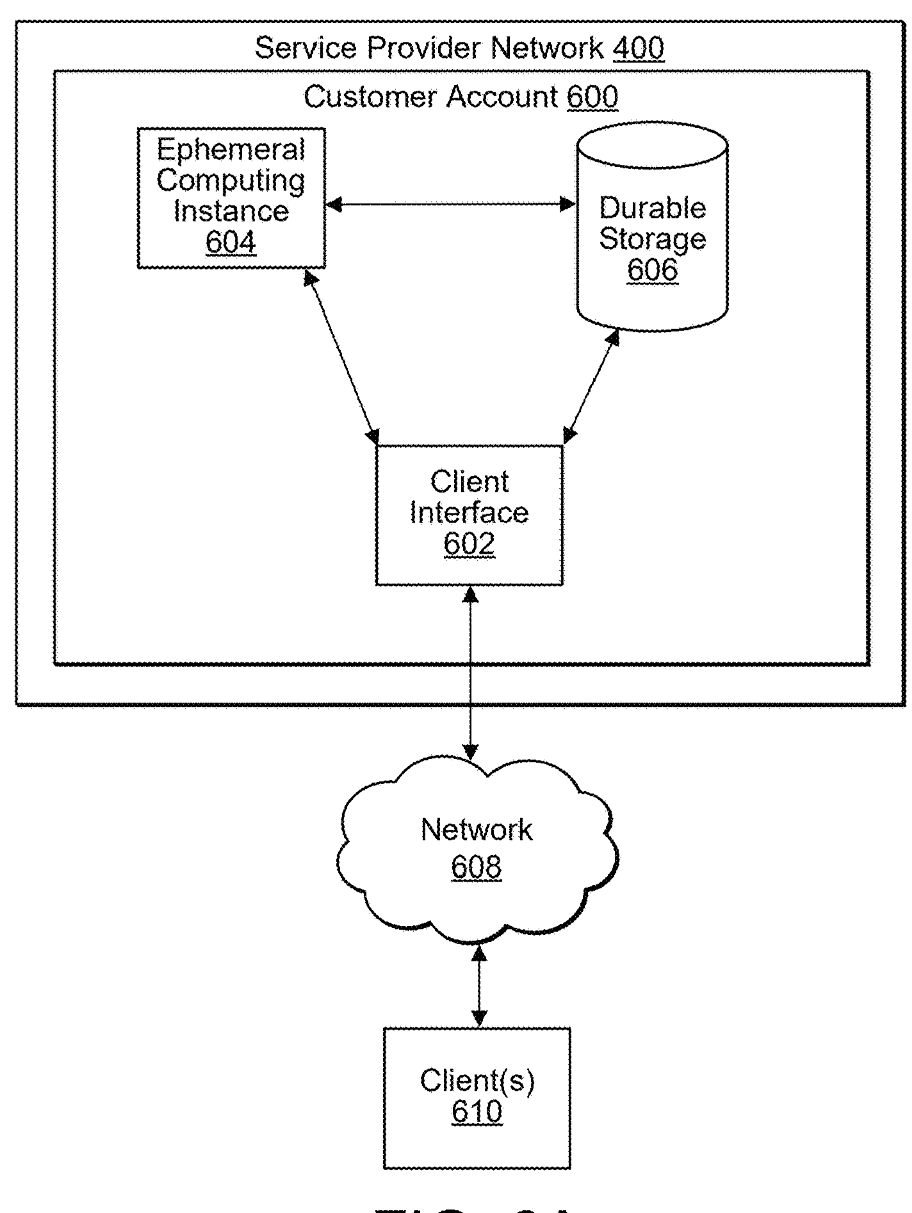
FIG. 6A is a block diagram illustrating a customer account which uses an ephemeral computing instance service for data item identification, according to some embodiments.

FIG. 6A is a block diagram illustrating a customer account which uses an ephemeral computing instance service for data item identification, according to some embodiments.

A service provider network 400 may provide customer accounts such as customer account 600 which are able to access and use services provided by the service provider network 400. Client(s) 610 may access the customer account 600 via a network 608, for example, the Internet. The client interface 602 may direct requests from client(s) 610 to a serverless function execution system, such as the serverless function execution system 200 illustrated in FIG. 2, and may accordingly cause actions of the serverless function execution system to occur. The service provider network 400 may provide the serverless function execution system to the customer account 600 by a serverless function execution service as illustrated in FIG. 4. A customer may be an owner of a customer account 600. A client 610 may be the customer or an entity which is authorized to use the customer account 600.

For example, the client interface 602 may receive a request to search a set of data items according to a particular attribute. The client interface 602 may have limited processing capability and storage space, and may request that the serverless function execution system performs the search. The serverless function execution system may cause a durable storage 606 to send instance instructions and inverted bitmap indexes which are needed to perform the search to an ephemeral computing instance 604. The ephemeral computing instance 604 may perform the search and return the results of the search to the client interface 602, as directed by the serverless function execution system.

An ephemeral computing instance 604 may also be called a function instance 252, and may be executed on a hardware processor which is not hosting a compute instance, or in a container, as illustrated in FIG. 2. A durable storage 606 may be implemented by the service provider network 400 for a customer account 600 using a storage bucket as illustrated in FIG. 4. The durable storage 606 may be maintained with no defined time of closure, and an ephemeral computing instance 604 may be maintained for a brief and defined period of time, for example, for the amount of time taken to execute a set of program instructions. A durable storage 606 may be maintained for longer than multiple existences of an ephemeral computing instance 604.

Figure 6B:
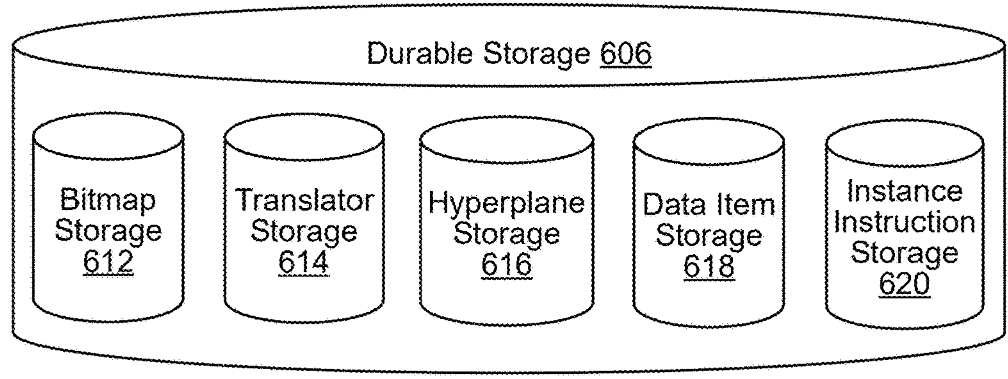
FIG. 6B is a block diagram illustrating elements relevant for data item identification using an ephemeral computing instance which are durably stored, according to some embodiments.

FIG. 6B is a block diagram illustrating elements relevant for data item identification using an ephemeral computing instance which are durably stored, according to some embodiments.

A durable storage 606 may be provided by a storage service of a service provider network, such as object storage buckets illustrated in FIG. 4. The durable storage 606 may be a logical component and may be implemented by multiple hardware storage devices (e.g., non-volatile storage devices). Bitmap storage 612 may store bitmaps which are include in inverted bitmap indexes which are used to perform searches of the data items. The bitmaps may be stored in bitmap storage 612 in compressed form, according to a lossless bitmap compression technique. For example, lossless bitmap compression techniques include run length encoding, Huffman coding, and arithmetic coding. For example, run length encoding may indicate a number of bits (i.e., a run) that a bitmap continues to be either only 0s or only 1s before switching to the other of 0 and 1 for another indicated number of bits.

Translator storage 614 may store translators such as attribute translators and data item translators which enable meaningful search of the inverted bitmap indexes. For example, the data item translators may specify for a given inverted bitmap index which bit positions are associated with which data items. Data items may be stored in data items storage 618, and full vectors representing the data items may also be stored in data item storage 618. Data items indicated by a search using an inverted bitmap index may be retrieved from the data item storage 618 and returned in response to the request to search.

Hyperplane storage 616 may store hyperplanes used to generate locality sensitive hashes for locality sensitive hash-based inverted bitmap indexes, as described with reference to FIG. 24-28B. The hyperplanes may be stored to generate search hashes usable with the locality sensitive hash-based inverted bitmap indexes based on a search vector. Instance instruction storage 620 may store program instructions which an ephemeral computing instance may run in order to perform a search of the data items using an inverted bitmap index. For example, a program instruction stored in instance instruction storage 620 may instruct the ephemeral computing instance to generate a binary vector based on a search vector and to run a XOR function for the resulting search binary vector across a copy of a vector-based inverted bitmap index. A count of the set bits at each bit position results in a Hamming distance between the search binary vector and a binary vector which corresponds to the data item associated with the bit position.

The program instructions from instance instruction storage 620 may be be provided to the ephemeral computing instance with the copy of the vector-based inverted bitmap index from bitmap storage 612 and a translator from translator storage 616 indicating which data items are associated with respective bit positions of the vector-based inverted bitmap index. The program instructions may further instruct the ephemeral computing instance to direct durable storage 606 to provide selected data items from data item storage 618 to a client interface.

Figure 7:
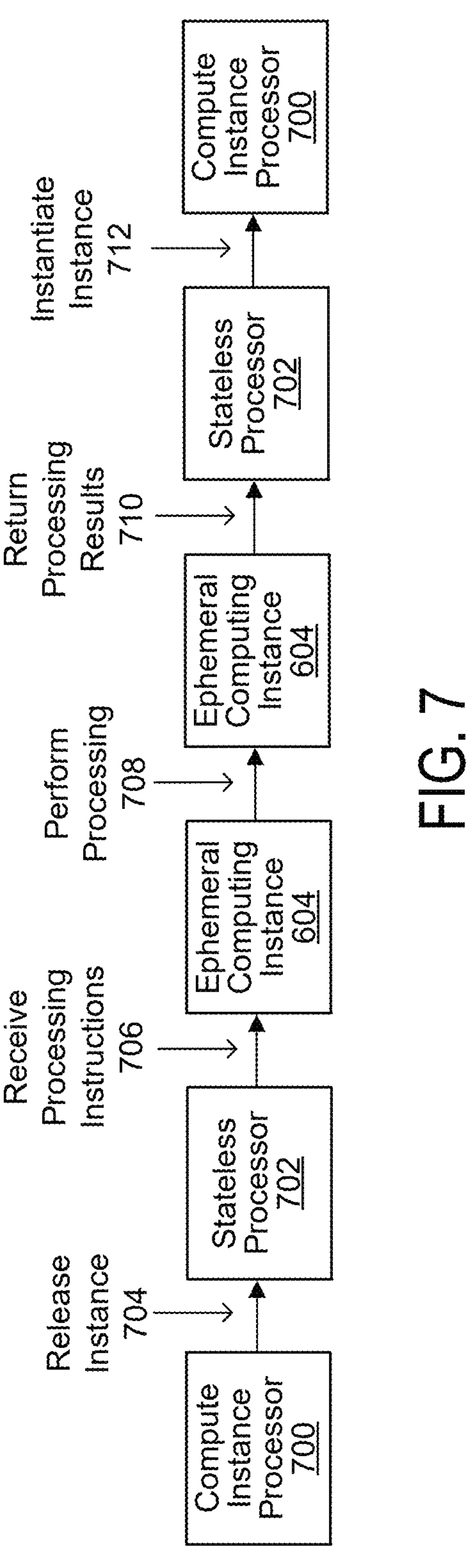
FIG. 7 is a block diagram illustrating a time-based relationship of an ephemeral computing instance to other states that a hardware processor may have, according to some embodiments.

FIG. 7 is a block diagram illustrating a time-based relationship of an ephemeral computing instance to other states that a hardware processor may have, according to some embodiments.

A hardware processor may be operating in a computing environment in conjunction with other computing systems as part of a compute instance. The compute instance may be configured to operate for an unspecified period of time. A compute instance processor 700, which is a hardware processor, may be released from a compute instance (704) when the hardware processor is not needed by compute instance or when the compute instance is not needed. The hardware processor may, after release from the compute instance (704), be a stateless processor 702. The stateless processor 702 may receive processing instructions 706. The processing instructions may lack elements found in instructions to instantiate a compute instance, and may instead be limited to specific computing actions which are included in the processing instructions. The processing instructions may be called functions. The hardware processor may, after receiving the processing instructions (706), be an ephemeral computing instance 604.

The ephemeral computing instance 604 may exist for the duration of time the ephemeral computing instance takes to perform the processing (708) of the processing instructions. During this time, the ephemeral computing instance 604 may operate with the usual capacity of the underlying hardware processor. The processing instructions may include a computing address to return processing results (710) which the ephemeral computing instance generates while performing the processing (708) according to the processing instructions. The hardware processor, after returning the processing results (710), may remove the processing instructions and other elements used while executing the processing instructions and return to being a stateless processor 702. The hardware processor, as a stateless processor 702, is available for inclusion in a compute instance. The hardware processor may be included in a compute instance (712) as a result of the compute instance being instantiated, expanding, or changing underlying hardware processors. The hardware processor, after instantiation of the compute instance (712) at the hardware processor, is again a compute instance processor 700 for an unspecified period of time.

Attribute Filtering Using Bitmap Index

FIG. 8 is a bit array illustrating how a set of bitmaps may be used as an inverted index to encode a large number of binary values associated with attributes for a large number of data items and how translators may be used to effectively use the set of bitmaps to search the data items according to the attributes, according to some embodiments.

A set of bitmaps (bitmap for first binary digit 804, bitmap for second binary digit 806, bitmap for third binary digit 808, and bitmap for Nth binary digit 810) may collectively represent an identifier inverted bitmap index. Individual bitmaps each represent a particular digit of a binary value, and individual bit positions each represent a particular data item. The copy of an identifier inverted bitmap index can be read by using an attribute translator 802 to determine a binary value (i.e., an identifier) from the set of $2^N$ possible binary values for a given bit position of the identifier inverted bitmap index. The data item translator 800 enables identification of a data item based on a bit position of the identifier inverted bitmap index.

For example, based on the illustrated identifier inverted bitmap index, a first data item is associated with the first bit position. The first bit in the bitmap for first binary digit 804 is 1, the first bit in the bitmap for second binary digit 806 is 0, the first bit in the bitmap for third binary digit 808 is 1, and the first bit in the bitmap for Nth binary digit 810 is 0. The first data item is therefore associated with the binary value 101 . . . 0, which according to the attribute translator 802 is associated with the sixth attribute. Therefore, based on the translators and the identifier inverted bitmap index, the first data item is associated with the sixth attribute.

A search of a copy of the identifier inverted bitmap index may follow a similar set of logical associations. The search may be a filter request for data items which are associated with the second attribute. An ephemeral computing instance may process the filter request by identifying the binary value associated with the second attribute (100 . . . 0). The ephemeral computing instance may use a series of logical operations (for example, a set of AND operations seeking the digits of the binary value of the attribute at the respective bitmaps for each bit position) to identify bit positions of the identifier inverted bitmap index which have an exact match to the binary value. When these logical operations are performed, the ephemeral computing instance finds that the second bit position is an exact match to the binary value associated with the second attribute. The ephemeral computing instance may then check the data item translator 800 to identify the data item that was indicated by the second bit position of the inverted index. The ephemeral computing instance returns the second data item or an indication to retrieve the second data item. The ephemeral computing instance may cache the copy of the identifier inverted bitmap index and translators in expectation of another request to filter based on an attribute or may release the copy of the identifier inverted bitmap index and translators and cause the underlying hardware processor to return to being a stateless processor.

Other operations not described can be executed to filter the copy of the identifier inverted bitmap index. For example, an OR filtering operation could be performed to find data items associated with different attributes by running multiple checks for the individual binary values of the different attributes and returning all data items that are located. Similarly, NOT and NOR operations could be used to exclude data items with particular attributes from a dataset.

The binary values illustrated as associated with the attributes in the attribute translator 802 are incremented in an order that is atypical for binary values. The binary values used in an identifier inverted bitmap index represent attributes which may not be numerical values. The binary values function as unique labels for the attributes and do not need to accord with any particular numerical standard.

FIG. 9 is a block diagram illustrating how multiple attributes of any particular data item may be stored using multiple inverted indexes, according to some embodiments.

Multiple identifier inverted bitmap indexes may be used to associate more than one attribute with a given data item. For example, the codes included in the identifier inverted bitmap indexes (i.e., bitmap index for first attribute 900, bitmap index for second attribute 902, and bitmap index for third attribute 904) illustrated in FIG. 9 may be billing codes for a business which are associated with event reports, such as diagnostic billing codes for a medical office associated with appointment records. The set of identifier inverted bitmap indexes may be searched individually for binary values which correspond to attributes of interest.

An ephemeral computing instance may also perform logical operations based on attributes located in different identifier inverted bitmap indexes. For example, the ephemeral computing instance may be instructed to find data items associated with code 2J83 AND code 0L54. The ephemeral computing instance may search all of bitmap index for first attribute 900, bitmap index for second attribute 902, and bitmap index for third attribute 904 and identify that the second bit position has code 2J83 and the fourth bit position has both code 2J83 and code 0L54. The ephemeral computing instance may identify the fourth bit position (and the associated fourth data item) as meeting the filter requirements of code 2J83 AND code 0L54. Other logical operations such as OR, NOT, and NOR may also be used to filter across multiple identifier inverted bitmap indexes.

The attribute translator may include a binary value for a null attribute, illustrated in FIG. 9 as blank. Additional identifier inverted bitmap indexes enable the association of multiple attributes with a given data item. Not every data item may have a number of attributes which is equal to the number of identifier inverted bitmap indexes provided, and a null attribute may be assigned to prevent incorrect association of a data item with an attribute.

Figure 10:
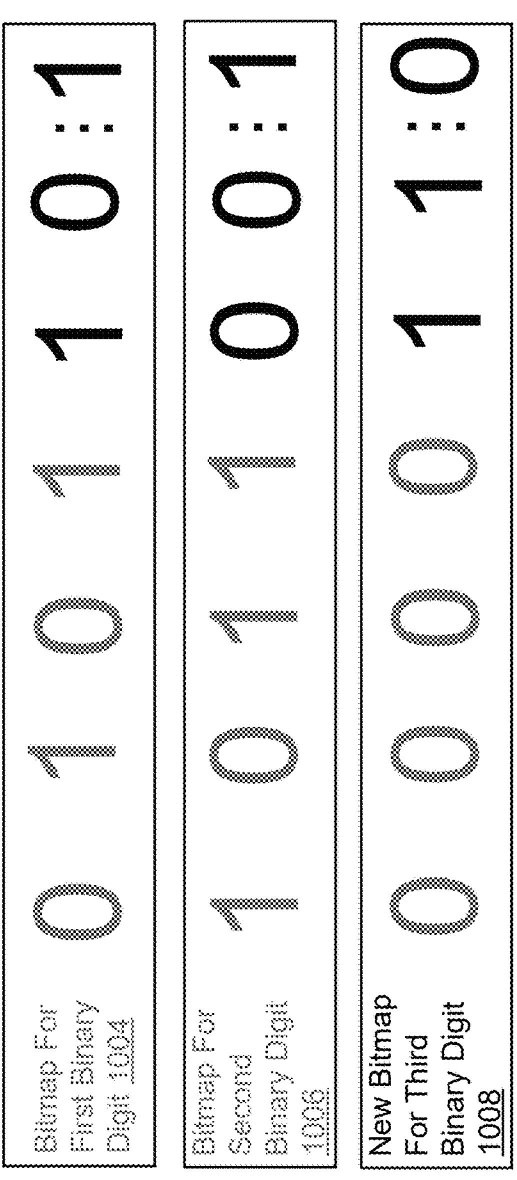
FIG. 10 is a bit array illustrating how an inverted index may be enlarged in response to additional attributes causing the total number of attributes to exceed a threshold number, according to some embodiments.

FIG. 10 is a bit array illustrating how an inverted index may be enlarged in response to additional attributes causing the total number of attributes to exceed a threshold number, according to some embodiments.

A given identifier inverted bitmap index can represent $2^N$ possible binary values associated with attributes, where N is the number of bitmaps in the identifier inverted bitmap index. If a number of attributes to be tracked across the dataset is increased beyond $2^N$ attributes, the identifier inverted bitmap index can be updated by adding bitmaps until the number of attributes falls within the $2^N$ threshold for the updated N.

In the example illustrated in FIG. 9, the previous dataset consisted of four data items (corresponding to the grey bit positions) with four ($2^2$) total attributes defined by attribute translator 1000. The updated dataset includes at least three new data items (the black bit positions) and eight total attributes defined by updated attribute translator 1002. To encode the binary values of all eight ($2^3$) three bitmaps are needed. The original dataset could be represented using bitmap for first binary digit 1004 and bitmap for second binary digit 1006. Updating the identifier inverted bitmap index to account for the new data and new attributes can be done by adding new bitmap for third binary digit 1008 to increase the total attributes which can be represented from four ($2^2$) to eight ($2^3$) and adding the new bit positions, which correspond to the new data items, to all three bitmaps.

Figures 11A, 11B:
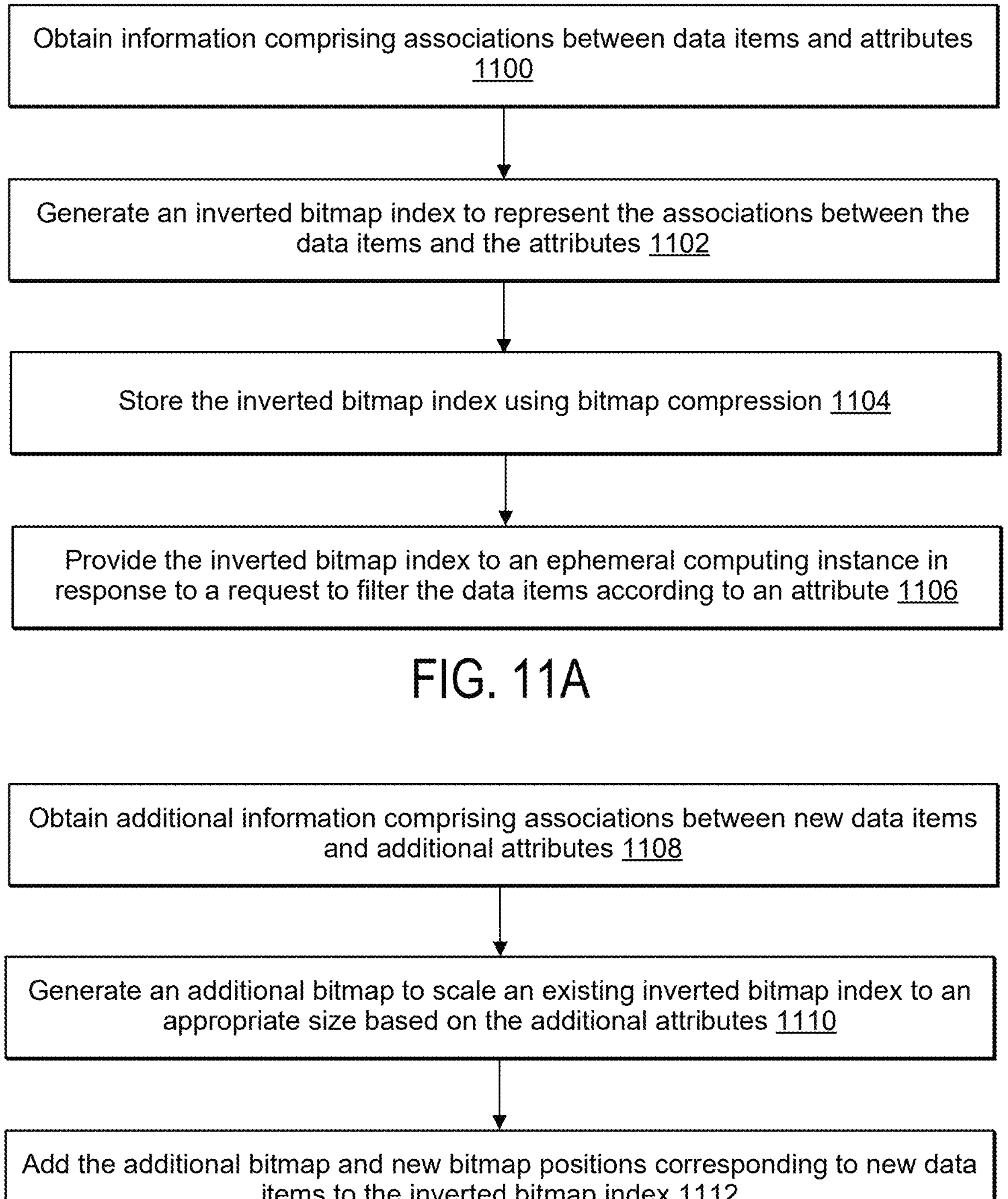
FIG. 11A is a flowchart illustrating how an identifier inverted bitmap index is made available to be used in a data item filtering process, according to some embodiments.
FIG. 11B is a flowchart illustrating how an identifier inverted bitmap index may be updated to accommodate new data items and attributes, according to some embodiments.

FIG. 11A is a flowchart illustrating how an identifier inverted bitmap index is made available to be used in a data item filtering process, according to some embodiments.

At 1100, a computing system performing intake for a search of an identifier inverted bitmap index obtains information comprising associations between data items and attributes. The computing system performing intake for a search of an identifier inverted bitmap index may be an ephemeral computing instance, a compute instance, or another type of computing system. At 1102, the computing system performing intake for a search of an identifier inverted bitmap index generates an inverted index bitmap to represent the association between the data items and the attributes. At 1104, the computing system performing intake for a search of an identifier inverted bitmap index durably stores the identifier inverted bitmap index using bitmap compression. At 1106, the durable storage provides a copy of the identifier inverted bitmap index to an ephemeral computing instance in response to a request to filter the data items according to and attribute.

FIG. 11B is a flowchart illustrating how an identifier inverted bitmap index may be updated to accommodate new data items and attributes, according to some embodiments.

At 1108, a computing system performing intake for a search of an identifier inverted bitmap index obtains additional information comprising associations between new data items and additional attributes. The computing system performing intake for a search of an identifier inverted bitmap index may be an ephemeral computing instance, a compute instance, or another type of computing system. The additional attributes may cause a total cardinality to exceed a threshold, i.e., the total number of attributes may exceed a number of attributes which can be represented by the number of bitmaps of the identifier inverted bitmap index.

At 1110, the computing system performing intake for a search of an identifier inverted bitmap index generates an additional bitmap to scale an existing identifier inverted bitmap index to an appropriate size based on the additional attributes. At 1112, the computing system performing intake for a search of an identifier inverted bitmap index adds the additional bitmap and new bit positions of the set of bitmaps corresponding to new data items to the identifier inverted bitmap index.

Figures 12A, 12B:
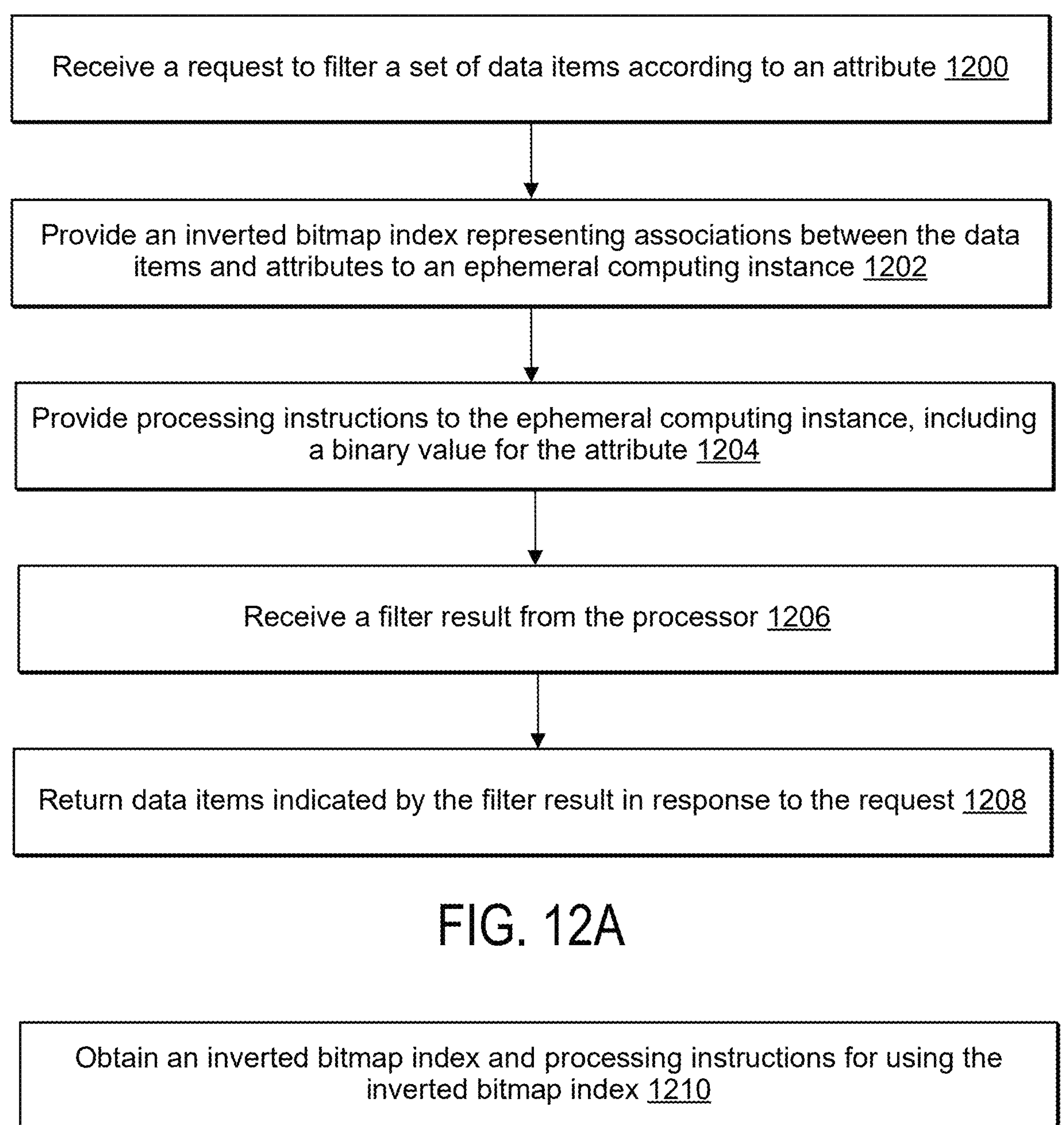
FIG. 12A is a flowchart illustrating how a customer account uses an ephemeral computing instance to perform a data filtering operation using an identifier inverted bitmap index, according to some embodiments.
FIG. 12B is a flowchart illustrating how an ephemeral computing instance performs a data filtering operation using an identifier inverted bitmap index, according to some embodiments.

FIG. 12A is a flowchart illustrating how a customer account uses an ephemeral computing instance to perform a data filtering operation using an identifier inverted bitmap index, according to some embodiments.

At 1200, a customer account receives a request to filter a set of data items according to an attribute. At 1202, the customer account provides (or causes a durable storage to provide) a copy of an identifier inverted bitmap index representing associations between the data items and attributes to an ephemeral computing instance. At 1204, the customer account provides (or causes the durable storage to provide) processing instructions to the ephemeral computing instance, including a binary value for the attribute or a translator.

At 1206, the customer account receives a filter result from the processor. The filter result may be a data item or an indication of a data item, such as a bit position of the identifier inverted bitmap index. At 1208, the customer account returns data items indicated by the filter result in response to the request to filter a set of data items according to an attribute.

FIG. 12B is a flowchart illustrating how an ephemeral computing instance performs a data filtering operation using an inverted index, according to some embodiments.

At 1210, an ephemeral computing instance obtains a copy of an identifier inverted bitmap index and processing instructions for using the copy of the identifier inverted bitmap index to filter a set of data items according to an attribute. At 1212, the ephemeral computing instance determines a binary value for an attribute to be used to filter the copy of the identifier inverted bitmap index. The ephemeral computing instance may determine the binary value based on being provided the binary value or based on a translator. At 1214, the ephemeral computing instance performs one or more logical operations on bitmaps of the copy of the identifier inverted bitmap index to identify data items associated with the attribute. For example, the ephemeral computing instance may perform a set of AND operations to identify bit positions of the copy of the identifier inverted bitmap index which have all bits matching the respective digits of the binary value.

Probabilistic Attribute Filtering Using Bitmap Index

FIG. 13 is a bit array illustrating how hashes for attributes of a probabilistic inverted bitmap index may be used to generate hashes for data items of the probabilistic inverted bitmap index, according to some embodiments.

An attribute translator 1310 may store associations between attributes and hashes used to represent the attributes. A probabilistic inverted hash index may store hashes such as hash for data item with first and third attribute 1308. An inverted hash index may be a particular type of inverted bitmap index where a given bitmap corresponds to a hash position. The hashes for data items may be, for example, Bloom filters constructed by combining attribute hashes. Another example of a filter which the hashes for data items may represent is a cuckoo filter. Other probabilistic filter types could be used. Each hash has a number of hash positions (N) equal to a number of bitmaps (N) which are included in the probabilistic inverted bitmap index.

Multiple attributes can be associated with a given data item using a probabilistic inverted hash index. A data item may be incorrectly identified as having an attribute the data item does not have with a false positive rate that is configurable based on the number of bitmaps used (i.e., the size of the hashes) and the number of hash positions which are set for each attribute. For example, a probabilistic inverted bitmap index with 1280 bitmaps may represent 1 million attributes with up to 20 attributes assigned to a given data item using 20 set hash positions per attribute with a false positive rate below 0.00001%. Due to the compressibility of bitmaps, the described probabilistic inverted bitmap index, which may represent information for 100,000 data items, may have a size below 15 MB.

The capability for an ephemeral computing instance using a copy of the probabilistic inverted bitmap index to return a false positive result can be understood using the hashes of the attribute translator 1310 (i.e., hash for first attribute 1300, hash for second attribute 1302, hash for third attribute 1304, and hash for Kth attribute 1306). Some set bits of the hashes overlap with set bits of other hashes, such as the second bit position in the hash for first attribute 1300 and the hash for Kth attribute 1306. Hashes of attributes are loaded into hashes for data items by setting bits of the hash for a data item according to the set bits of all the hashes for attributes associated with the data item. For example, hash for data item with first and third attributes 1308 has the first, second, fourth, fifth, seventh, and Nth bits set. The hash for first attribute 1300 caused the second, fourth, and fifth bits to be set and the hash for third attribute 1304 caused the first, seventh, and Nth bits to be set. Due to bit overlap, a filter search for the hash for the second attribute 1302 (which has the first, fourth, and Nth bits set) would identify the hash for data item with first and third attributes 1308 as being associated with the second attribute.

FIG. 14 is a bit array illustrating how hashes for data items may be arranged to generate a probabilistic inverted bitmap index, according to some embodiments.

A probabilistic inverted bitmap index includes bitmaps which correspond to hash positions (i.e., bitmap for first hash position 1402, bitmap for second hash position 1404, bitmap for third hash position 1406, and bitmap for Nth hash position 1408). The bitmaps each correspond to a hash position of the hashes for data items, which may be Bloom filters constructed by combining, for a given data item hash, the hashes of attributes associated with the given data item.

The data item translator 1400 indicates which bit positions of the probabilistic inverted bitmap index are associated with which data item. The association between bit positions and data items enables an ephemeral computing instance to identify data items based on the probabilistic inverted bitmap index. The ephemeral computing instance may use attribute translator 1310 and data item translator 1400 in combination to filter the data items according to a given attribute using the probabilistic inverted bitmap index.

A set of identifier inverted bitmap indexes and a probabilistic inverted bitmap index may each be used to determine attribute statistics, for example, the percentage of data items which are associated with a given attribute. Between the two, a probabilistic inverted bitmap index may be preferable for determining attribute statistics because to determine the percentage of data items which correspond to an attribute, only bitmaps which correspond to set bits of the attribute hash need to be loaded to the ephemeral computing instance, whereas the entire set of identifier inverted bitmap indexes would be loaded to the ephemeral computing index to determine the same information. Additionally, for determining attribute statistics for all attributes, an entire probabilistic inverted bitmap index may be smaller than a corresponding set of identifier inverted bitmap indexes containing the same information, and thus may be faster to load to the ephemeral computing instance.

FIG. 15 is a bit array illustrating how a search hash may be used to probabilistically search the data items according to an attribute or set of attributes, according to some embodiments.

A copy of a probabilistic inverted bitmap index may be used similarly to a copy of an inverted bitmap index as described in relation to FIG. 8. A search request may specify an attribute. An ephemeral computing instance may identify a hash associated with the attribute (i.e., a search hash 1500) and perform a set of logical operations (such as a set of AND operations) to identify bit positions which have the relevant hash positions set to 1. In the illustrated example, the relevant bitmaps are bitmap for second hash position 1404 and bitmap for Nth hash position 1408 because the search hash 1500 has the second and Nth hash positions set to 1. The ephemeral computing instance may ignore bitmaps which correspond to hash positions which are 0 in the search hash 1500 because a data item may have those hash positions set as a result of being associated with other attributes. A search match 1502 indicates that the data item associated with the bit position may have the attribute associated with the search hash, with the configurable false positive rate described in relation to FIG. 13.

In some embodiments, an ephemeral computing instance may run an AND-type filter operation for data items with multiple attributes by generating a search hash 1500 which includes the hashes for the multiple attributes. The ephemeral computing instance may also perform the AND-type filter operation and other operations (such as OR, NOT, and NOR operations) by searching for data items with multiple search hashes which are each associated with only one attribute. The ephemeral computing instance may cache the copy of the probabilistic inverted bitmap index and translators in expectation of another request to filter based on an attribute or may release the copy of the probabilistic inverted bitmap index and translators and cause the underlying hardware processor to return to being a stateless processor.

Figure 16:
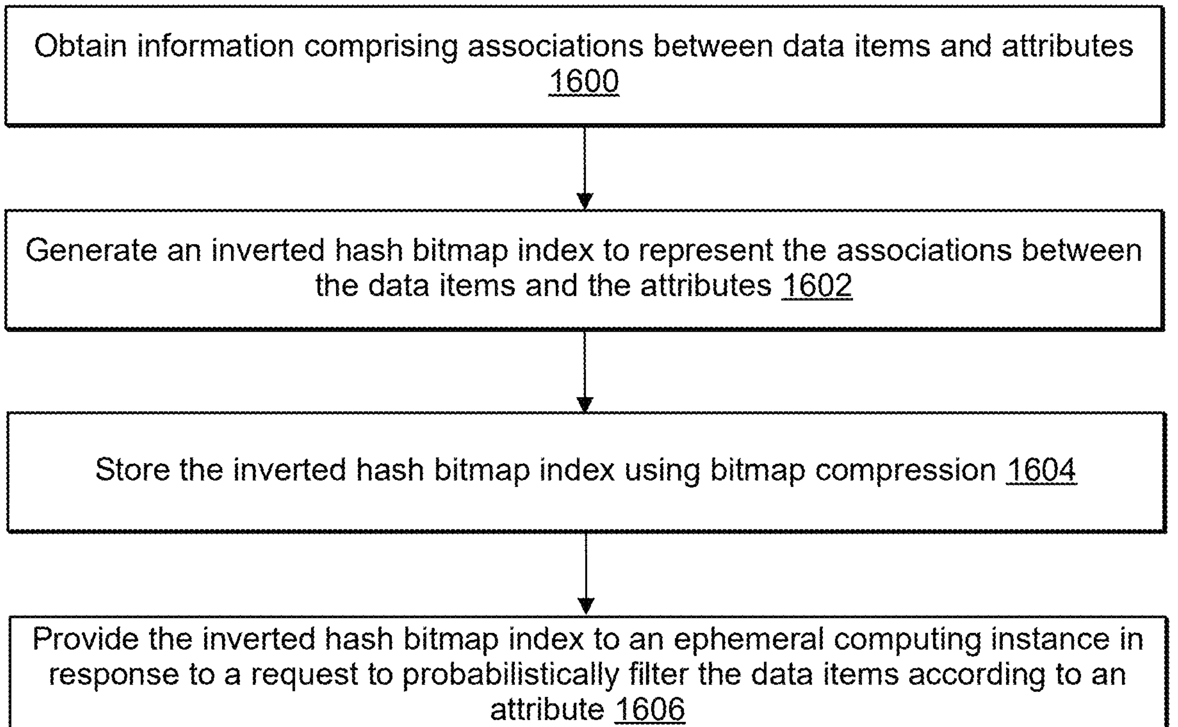
FIG. 16 is a flowchart illustrating how a probabilistic inverted bitmap index is made available to be used in a data item filtering process, according to some embodiments.

FIG. 16 is a flowchart illustrating how a probabilistic inverted bitmap index is made available to be used in a data item filtering process, according to some embodiments.

At 1600, a computing system performing intake for a filter operation using a probabilistic inverted bitmap index obtains information comprising associations between data items and attributes. The computing system performing intake for a search of a probabilistic inverted bitmap index may be an ephemeral computing instance, a compute instance, or another type of computing system. At 1602, the computing system performing intake for a filter operation using a probabilistic inverted bitmap index generates a probabilistic inverted bitmap index to represent the associations between the data items and the attributes. At 1604, the computing system performing intake for a filter operation using a probabilistic inverted bitmap index durably stores the probabilistic inverted bitmap index using bitmap compression. At 1606, the durable storage provides a copy of the probabilistic inverted bitmap index to an ephemeral computing instance in response to a request to probabilistically filter the data items according to an attribute.

Figure 17A:
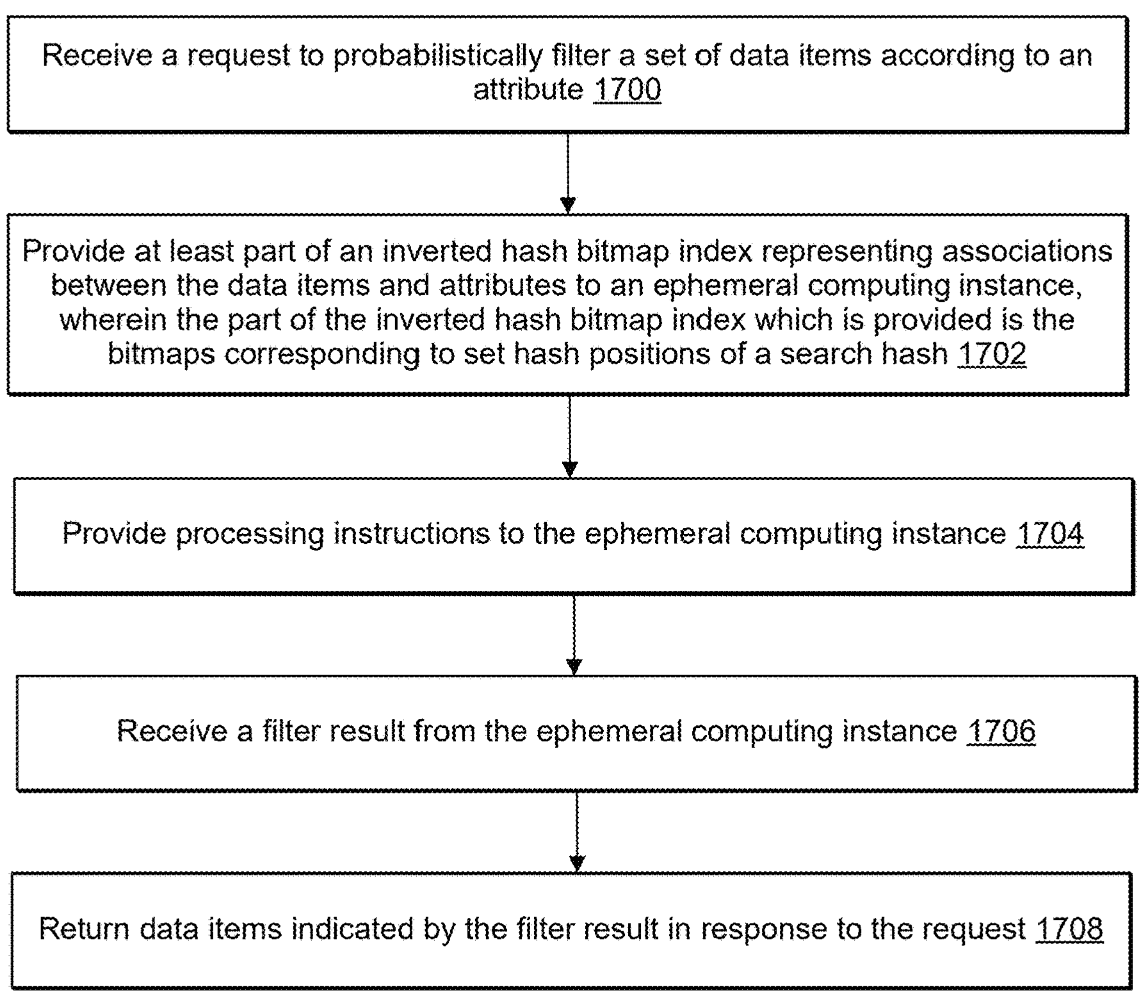
FIG. 17A is a flowchart illustrating how a customer account uses an ephemeral computing instance to perform a probabilistic data filtering operation using a probabilistic inverted bitmap index, according to some embodiments.

FIG. 17A is a flowchart illustrating how a customer account uses an ephemeral computing instance to perform a probabilistic data filtering operation using a probabilistic inverted bitmap index, according to some embodiments.

At 1700, a customer account receives a request to probabilistically filter a set of data items according to an attribute. At 1702, the customer account provides (or causes a durable storage to provide) at least part of a copy of a probabilistic inverted bitmap index representing associations between the data items and attributes to an ephemeral computing instance, wherein the part of a copy of the probabilistic inverted bitmap index which is provided to the ephemeral computing instance is the bitmaps which correspond to set hash positions of a search hash which corresponds to the attribute. At 1704, the customer account provides (or causes the durable storage to provide) a copy of processing instructions to the ephemeral computing instance.

At 1706, the customer account receives a filter result from the ephemeral computing instance. The filter result may be one or more data items or may indicate one or more data items. At 1708, the customer account returns the one or more data items indicated by the filter result in response to the request to probabilistically filter a set of data items according to an attribute.

Figure 17B:
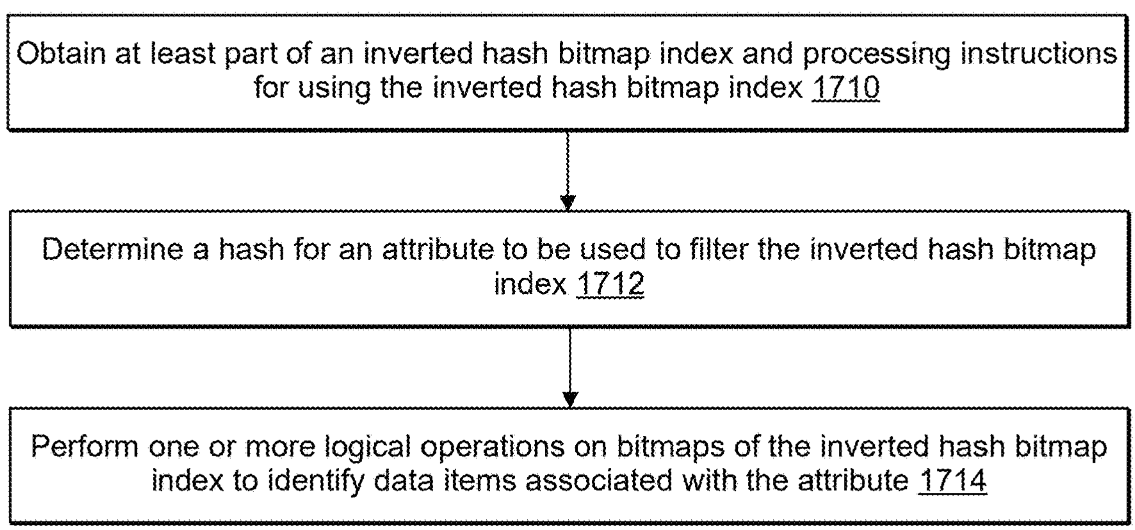
FIG. 17B is a flowchart illustrating how an ephemeral computing instance performs a probabilistic data filtering operation using a probabilistic inverted bitmap index, according to some embodiments.

FIG. 17B is a flowchart illustrating how an ephemeral computing instance performs a probabilistic data filtering operation using a probabilistic inverted bitmap index, according to some embodiments.

At 1710, an ephemeral computing instance obtains at least part of a copy of a probabilistic inverted bitmap index and processing instructions for using the a probabilistic inverted bitmap index. At 1712, the ephemeral computing instance determines a hash for an attribute to be used to filter the probabilistic inverted bitmap index. The ephemeral computing instance may determine the hash which is to be used to filter the copy of the probabilistic inverted bitmap index based on receiving the hash, based on receiving a set of bitmaps of the copy of a probabilistic inverted bitmap index which correspond to set hash positions of a hash, or based on a translator.

At 1714, the ephemeral computing instance performs one or more logical operations on bitmaps of the copy of the probabilistic inverted bitmap index to identify data items associated with the attribute. For example, the ephemeral computing instance may use only the bitmaps of the copy of the probabilistic inverted bitmap index which correspond to set hash positions of the hash and perform a set of AND operations to identify bit positions which have all bits set, and identify the data items corresponding to the bit positions with all bits set.

Binary Vector Search Using Bitmap Index

FIG. 18 is a block diagram illustrating how a binary vector can be generated based on a full vector, according to some embodiments.

Data items may be represented by vectors 1800. The position of a vector 1800 may indicate information about a data item represented by the vector 1800. For example, a pair of vectors which are positioned close together may be more closely related to each other than another pair of vectors which are positioned further from each other are related. The closest vectors (e.g., the nearest neighbor vectors) to a search vector may be associated with data items which are responsive to a search request involving the search vector. The search vector may, for example, be generated by an encoder based on user input or based on a data item similar to a target data item.

A binary vector 1804 is a vector with N number of dimensions, each of which may be a 1 or a 0. A binary vector 1804 may be based on a vector 1800 which is not a binary vector. As used herein, a vector which is not a binary vector may be called a full vector. A full vector 1800 may be represented by a binary vector 1804 by selecting a 0 or a 1 for each dimension of the full vector 1800. The conversion from a full vector 1800 to a binary vector 1804 may be based on a midpoint value, such as an average for a given dimension across the dataset of vectors. Dimension average 1802 may be the calculated averages for each of the dimensions of vectors included in the dataset of vector 1800. Other midpoint values, such as median values or consistent values such as 0, may also be used to convert a full vector 1800 into a binary vector 1800. The midpoint values, such as the dimension averages for the dataset, may be durably stored so that a search vector can be converted into a search binary vector using the same midpoint values which were used to create the binary vectors. For a dataset which is expected to expand, static midpoint values such as 0 may be preferred as midpoint values. The midpoint values and binary vectors for a dataset which has changed membership may be recalculated based on the updated membership.

As illustrated in FIG. 18, the dimensions of the binary vector 1804 are set or unset based on whether the corresponding dimension of the vector 1800 is above or below the dimension average 1802. For example, the first dimension of the vector 1800, −0.29, is below the average of the first dimension (1802), −0.21, so the first dimension of the binary vector 1804 is 0. The second dimension of the vector 1800, 0.73, is above the average of the second dimension (1802), 0.54, so the second dimension of the binary vector 1804 is 1. For a dimension of the vector 1800 which is equal to the dimension average 1802, such as the third dimension as illustrated in FIG. 18, the corresponding dimension of the binary vector 1804 may be either set or unset, and whether the equal state is set or unset is consistent for the conversion of vectors to binary vectors for the dataset to be included in the vector-based inverted bitmap index.

FIG. 19 is a bit array illustrating how a vector-based inverted bitmap index can be searched using a search binary vector, according to some embodiments.

A vector-based inverted bitmap index may include bitmaps (i.e., bitmap for first dimension 1904, bitmap for second dimension 1906, bitmap for third dimension 1908, and bitmap for Nth dimension 1910) which correspond to respective dimensions of binary vectors of the data items. The data items may correspond to bit positions of the vector-based inverted bitmap index, and the association between the data items and the bit positions may be stored in a data item translator 1900.

An ephemeral computing instance may perform a nearest neighbor search for vectors represented in a copy of a vector-based inverted bitmap index by performing a set of logical operations using a search binary vector 1902. For example, the ephemeral computing instance may perform a set of XOR operations on a copy of the vector-based inverted bitmap index using the search binary vector 1902 and generate a count for each bit position. The count indicates the Hamming distance between the search binary vector and the vector associated with the data item for a given bit position. A Hamming distance of 0 may be an exact match, such as search match 1912 illustrated in FIG. 19. Data items associated with binary vectors that have Hamming distances from a search binary vector 1902 that are below a threshold (i.e., the binary vectors are nearest neighbor vectors of the search binary vector 1902) may be identified by the ephemeral computing instance as relevant data items for the search.

Hamming distance may be calculated using a bitmap data structure. Because bitmaps can be compressed, performing the calculations with bitmap data structure may reduce the amount of data which an ephemeral computing instance has to maintain while performing the logical operations on the inverted bitmap index to identify relevant data items. For example, the count which follows a XOR operation on a vector-based inverted bitmap index for calculating Hamming distance may be represented using a binary addition operation across a set of bitmaps which represent an integer value of the count. For example, the ephemeral computing instance may perform successive XOR operations against the bitmap representing the least significant digit of the count bitmaps against the individual bitmaps which result from the XOR operation using the search binary vector. Overflow from the XOR operations would affect the bitmap corresponding to the next least significant digit, and overflow from the bitmap corresponding to the next least significant digit would affect the bitmap corresponding to the third least significant digit. The count can similarly be read directly from the bitmaps using bitmap operations.

An inverse Hamming distance which represents the number of matching dimensions between a search binary vector and a binary vector instead of the distance between the search binary vector and the binary vector may also be calculated using a bitmap data structure. The logical operations may be to perform a series of AND operations on the vector-based inverted bitmap index relative to the search binary vector such that matching dimensions are set to 1, and a count may be obtained as described above. The count may correspond to the inverse Hamming distance, and the data items which are associated with the highest count may be associated with the nearest neighbor vectors of the search vector. Where Hamming distance is referred to in this application, similar information may be obtained using an inverse Hamming distance.

In some embodiments, the ephemeral computing instance may determine the search binary vector 1902 contains a number of dimensions above a threshold, for example a threshold indicating that a corresponding copy of a vector-based inverted bitmap index of the same number of dimensions would be too large to load into the ephemeral computing instance. The ephemeral computing instance may receive only copies of some bitmaps of the vector-based inverted index, for example, the bitmaps corresponding to either the set or unset bits of the search binary vector, X randomly selected bitmaps, or the Xth first bitmaps of the vector-based inverted index, where X is the threshold limit of bitmaps which can be loaded into the ephemeral computing instance.

In some embodiments, the vector-based inverted bitmap index is associated with a cluster and the ephemeral computing instance determines a cluster of the search binary vector, then loads a copy of the vector-based inverted bitmap index associated with the cluster.

FIG. 20 is a block diagram illustrating a possibility for re-ranking a set of apparent nearest neighbor vectors based on full vectors rather than binary vectors, according to some embodiments.

The ephemeral computing instance may select a group of nearest neighbor binary vectors to the search binary vector, for example, the three binary vectors with the lowest Hamming distances to the search vector and obtain additional information about the associated data items to re-rank the data items. The additional information may be, for example, copies of the complete binary vectors representing the data items if the entire vector-based inverted bitmap index was not used to generate the Hamming distances, copies of full vectors representing the data items as illustrated in FIG. 20, or copies of the data items. The additional information may be compared to a similar search item, for example, complete binary vectors may be compared to the complete search binary vector, full vectors (such as vector for best match 2002, vector for second best match 2004, and vector for third best match 2006) may be compared to a full search vector (such as search vector 2000), and data items may be compared to the input which was used to generate the search vector (i.e., the input may be user input or a data item similar to a target data item and the ephemeral computing instance may perform a keyword search of the data items based on the input).

The ephemeral computing device may use vector distance calculation techniques such as Euclidean distance or cosine similarity to determine the nearest neighbor vectors to search vector 2000. The ephemeral computing device may return the data item associated with the nearest neighbor vector the search vector 2000, or may return an indication of the data item. A search request may indicate a desired number of data items, or a desired threshold level of closeness. The threshold level of closeness may be based on a metric measurable through binary vectors such as Hamming distance to a search binary vector or based on a metric measurable through a re-ranking technique such as Euclidean distance or cosine similarity of a full vector to a search vector.

FIG. 21 is a bit array illustrating how a vector-based inverted bitmap index can be divided into clusters, resulting in multiple smaller vector-based inverted bitmap indexes, according to some embodiments.

To reduce the size of bitmaps of the vector-based inverted bitmap index, a vector-based inverted bitmap index may be divided into clusters. Clustering may be based on divisions of vector-space according to a variety of clustering techniques, such as K-means clustering, cover tree clustering, clustering based on hyperplane divisions of vector-space, or other clustering techniques. A vector-based inverted bitmap index which includes representations of binary vectors for a number of data items beyond a threshold amount of data items may be divided into multiple vector-based inverted bitmap indexes which are associated with respective clusters. The associated data item translator for the vector-based inverted bitmap index may also be divided according to the respective clusters (such as first cluster data item translator 2100 and second cluster data item translator 2102), so an ephemeral computing instance only needs to be provided with the translator and vector-based inverted bitmap index associated with one cluster, such as a cluster of the search binary vector.

In the example illustrated in FIG. 21, the vector-based inverted bitmap index shown in FIG. 19 is divided into two clusters, a first cluster and a second cluster. The clusters each have a number of bitmaps (N) matching the original number of bitmaps of the original vector-based inverted bitmap index. An ephemeral computing instance searching for nearest neighbor binary vectors of a search binary vector of the first cluster may receive first cluster data item translator 2100, bitmap for first dimension of first cluster 2104, bitmap for second dimension of first cluster 2106, bitmap for third dimension of first cluster 2108, and bitmap for Nth dimension of first cluster 2110. An ephemeral computing instance searching for nearest neighbor binary vectors of a search binary vector of the second cluster may receive second cluster data item translator 2102, bitmap for first dimension of second cluster 2112, bitmap for second dimension of second cluster 2114, bitmap for third dimension of second cluster 2116, and bitmap for Nth dimension of second cluster 2118.

Figure 22A:
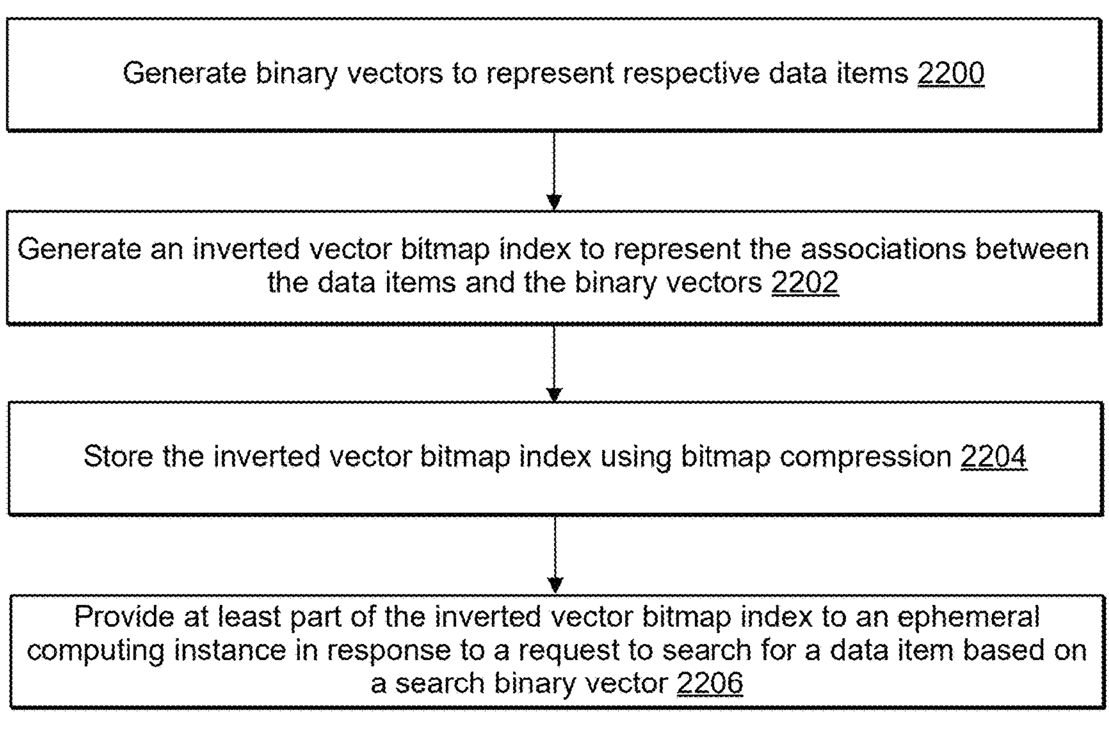
FIG. 22A is a flowchart illustrating how a vector-based inverted bitmap index is made available to be used in a data item search process, according to some embodiments.

FIG. 22A is a flowchart illustrating how a vector-based inverted bitmap index is made available to be used in a data item search process, according to some embodiments.

At 2200, a computing system performing intake for a search of a vector-based inverted bitmap index generates binary vectors to represent respective data items. The computing system performing intake for a search of a vector-based inverted bitmap index may be an ephemeral computing instance, a compute instance, or another type of computing system. At 2202, the computing system performing intake for a search of a vector-based inverted bitmap index generates a vector-based inverted bitmap index to represent the associations between the data items and the binary vectors. At 2204, the computing system performing intake for a search of a vector-based inverted bitmap index durably stores the vector-based inverted bitmap index using bitmap compression. At 2206, the durable storage provides a copy of at least part of the vector-based inverted bitmap index to an ephemeral computing instance in response to a request to search for a data item based on a search binary vector.

Figure 22B:
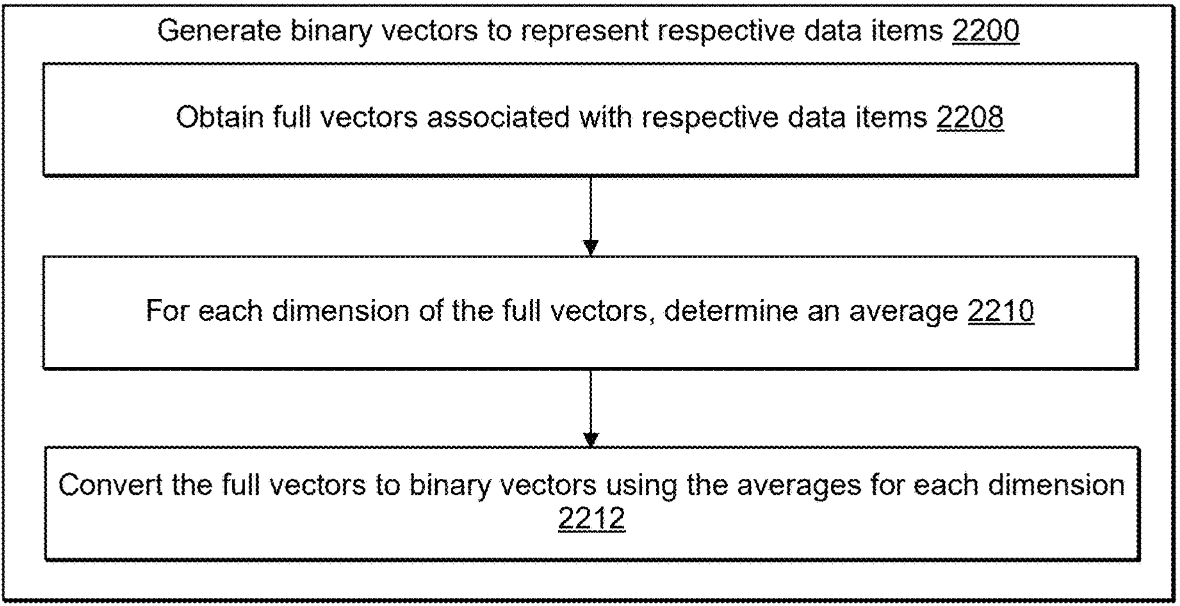
FIG. 22B is a flowchart illustrating how binary vectors to be included in a vector-based inverted bitmap index can be generated, according to some embodiments.

FIG. 22B is a flowchart illustrating how binary vectors to be included in a vector-based inverted bitmap index can be generated, according to some embodiments.

To perform generating binary vectors to represent respective data items (2200), a computing system performing intake for a search of a vector-based inverted bitmap index performs steps 2208-2212. At 2208, the computing system performing intake for a search of a vector-based inverted bitmap index obtains full vectors associated with each of the respective data items. At 2210, the computing system performing intake for a search of a vector-based inverted bitmap index determines an average value for each dimension of the full vectors. The average values may be consistent across the entire dataset, i.e., the averages may be calculated based on the entire dataset. For a dataset which expands, for example via batching, the average values and the binary vectors may be recalculated. The computing system performing intake for a search of a vector-based inverted bitmap index may alternatively use another type of midpoint value, for example, a median value, or a consistent value such as 0.

At 2212, the computing system performing intake for a search of a vector-based inverted bitmap index converts the full vectors to binary vectors using the averages for each dimension. For example, the computing system performing intake for a search of a vector-based inverted bitmap index may set a dimension of a binary vector to be 0 if the dimension in a corresponding full vector is below the average value for the dimension and the computing system performing intake for a search of a vector-based inverted bitmap index may set a dimension of a binary vector to be 1 if the dimension in a corresponding full vector is at or above the average value for the dimension.

Figures 23A, 23B:
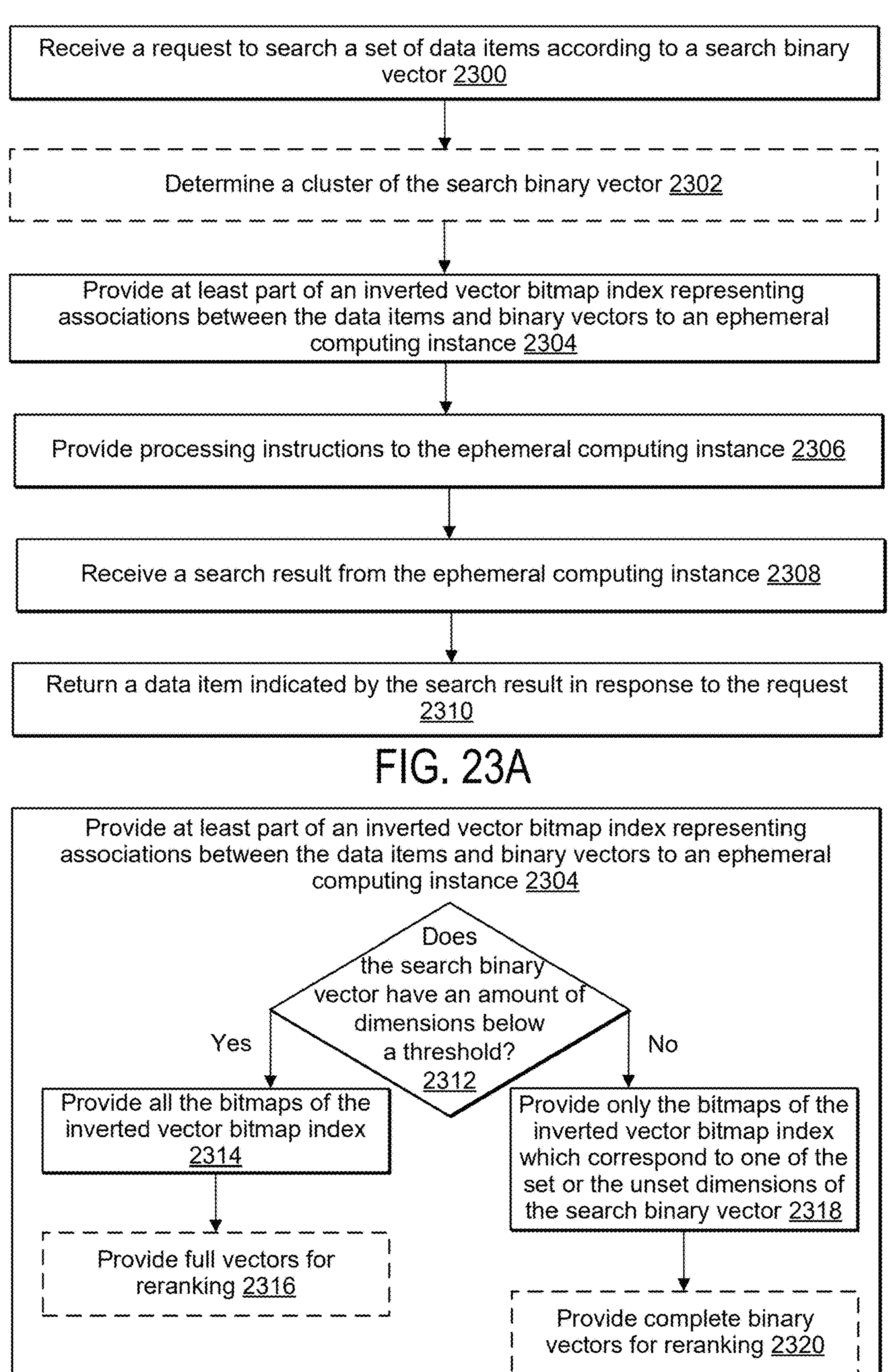
FIG. 23A is a flowchart illustrating how a customer account uses an ephemeral computing instance to perform a data item search process using a vector-based inverted bitmap index, according to some embodiments.
FIG. 23B is a flowchart illustrating how a customer account selects a portion of a vector-based inverted bitmap index for use in a data item search process by an ephemeral computing instance and possible associated re-ranking options, according to some embodiments.

FIG. 23A is a flowchart illustrating how a customer account uses an ephemeral computing instance to perform a data item search process using a vector-based inverted bitmap index, according to some embodiments.

At 2300, a customer account receives a request to search a set of data items according to a search binary vector. The customer account may receive the search binary vector, generate the search binary vector, or provide a full vector to an ephemeral computing instance to generate the search binary vector. For embodiments using clustering, at 2302 the customer account determines a cluster of the search binary vector. At 2304, the customer account provides (or causes a durable storage to provide) a copy of at least part of a vector-based inverted bitmap index representing associations between the data items and binary vectors to an ephemeral computing instance. At 2306, the customer account provides (or causes a durable storage to provide) a copy of processing instructions for how to use the search binary vector to perform a search of the copy of the vector-based inverted bitmap index to the ephemeral computing instance. At 2308, the customer account receives a search result from the ephemeral computing instance. The search result may be the data item or may indicate the data item, for example the ephemeral computing instance may return the bit position in the copy of the vector-based inverted bitmap index of the identified data item. At 2310, the customer account returns a data item indicated by the search result in response to the request to search the set of data items according to the search binary vector.

FIG. 23B is a flowchart illustrating how a customer account selects a portion of a vector-based inverted bitmap index for use in a data item search process by an ephemeral computing instance and possible associated re-ranking options, according to some embodiments.

To perform providing a copy of at least part of a vector-based inverted bitmap index representing associations between the data items and binary vectors to an ephemeral computing instance (2304), a customer account may follow the decision tree illustrated in FIG. 23B. At 2312, the customer account determines whether the search binary vector has an amount of dimensions below a threshold, for example, a threshold indicating that a corresponding vector-based inverted bitmap index is too large for an ephemeral computing instance. If the search binary vector has an amount of dimensions below the threshold, at 2314 the customer account provides copies all the bitmaps of the vector-based inverted bitmap index to the ephemeral computing instance, or causes a durable storage to provide copies of all the bitmaps of the vector-based inverted bitmap index to the ephemeral computing instance. For embodiments which perform a re-ranking operation, at 2316 the customer account provides the data items or full vectors associated with the data items to the ephemeral computing instance.

If the search binary vector has an amount of dimensions which is not below the threshold, at 2318 the customer account provides (or causes a durable storage to provide) the ephemeral computing instance with copies of only the bitmaps of the vector-based inverted bitmap index which correspond to one of the set of the unset dimensions of the search binary vector. For example, the customer account may provide (or cause a durable storage to provide) the ephemeral computing instance with copies of only the bitmaps of the vector-based inverted bitmap index which correspond to set bits of the search binary vector, i.e., dimensions of the search binary vector which are 1 rather than 0. For embodiments which perform a re-ranking operation, at 2320 the customer account provides the data items, full vectors associated with the data items, or complete binary vectors associated with the data items to the ephemeral computing instance.

Figure 23C:
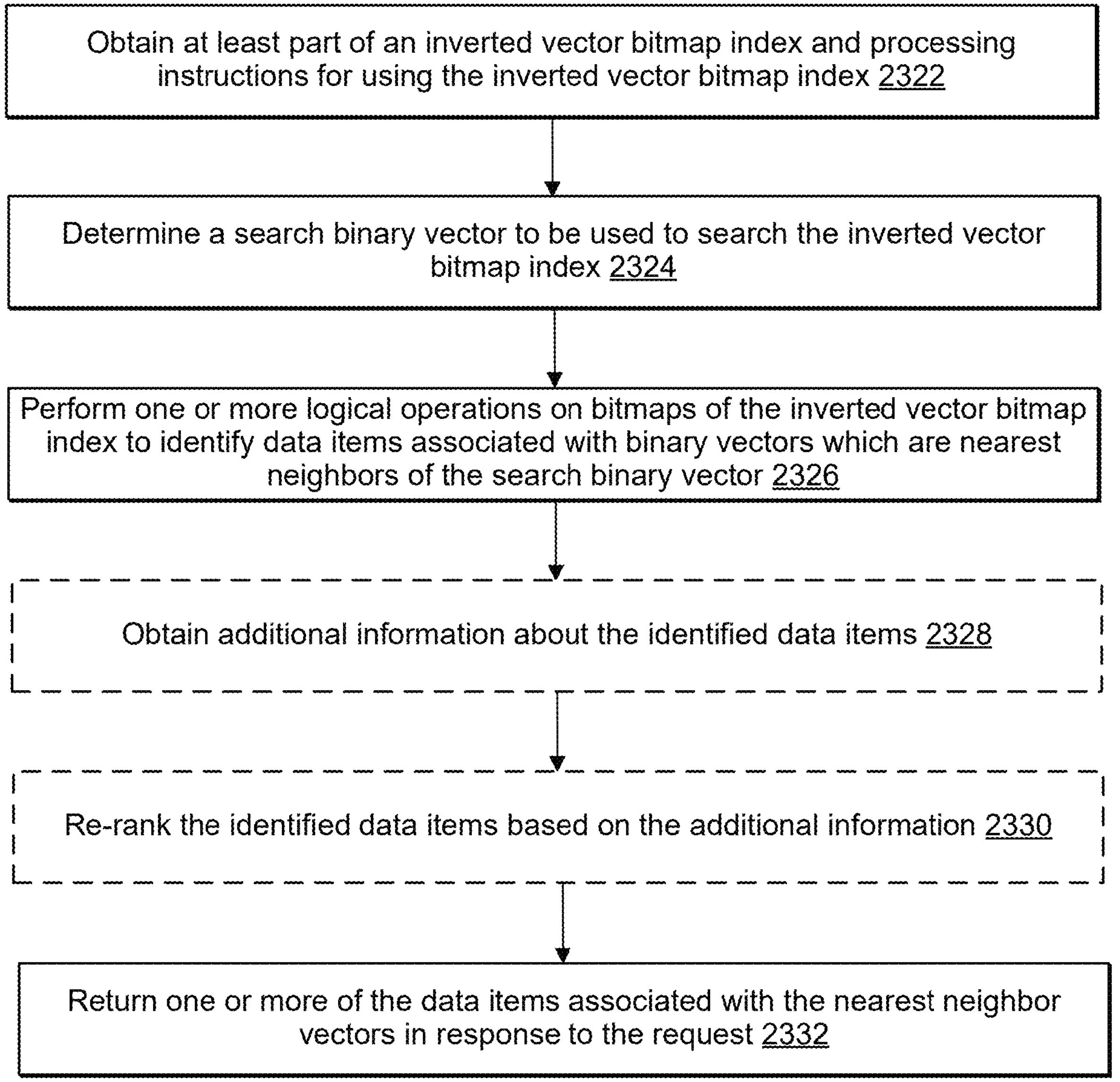
FIG. 23C is a flowchart illustrating how an ephemeral computing instance performs a data item search process using a vector-based inverted bitmap index, according to some embodiments.

FIG. 23C is a flowchart illustrating how an ephemeral computing instance performs a data item search process using a vector-based inverted bitmap index, according to some embodiments.

At 2322, an ephemeral computing instance obtains at least part of a vector-based inverted index and processing instructions for using the vector-based inverted bitmap index. At 2324, the ephemeral computing instance determines a search binary vector to be used to search the vector-based inverted index. The ephemeral computing instance may determine the search binary vector based on being provided the search binary vector, or based on a full vector. In some embodiments, the copy of the part of the vector-based inverted bitmap index which is obtained is based on the search binary vector, for example, the copy of the part of the vector-based inverted bitmap index which is obtained may be copies of bitmaps of the vector-based inverted bitmap index which correspond to set bits of the search binary vector. As another example, the copy of the vector-based inverted bitmap index which is obtained may be associated with a cluster that the search binary vector is also associated with.

At 2326, the ephemeral computing instance performs one or more logical operations on the copies of bitmaps of the vector-based inverted bitmap index to identify data items associated with binary vectors which are nearest neighbors of the search binary vector. For example, the ephemeral computing instance may use XOR operations to determine the Hamming distances of the binary vectors for each data item from the search binary vector. A binary vector with a 0 Hamming distance to the search vector may be an exact match. The ephemeral computing instance may identify a group of data items with low Hamming distances to the search binary vector to perform a re-ranking operation. For example, the ephemeral computing instance may identify data items with a Hamming distance below a threshold or a defined number of data items which have the lowest Hamming distances.

In embodiments using a re-ranking operation, at 2328, the ephemeral computing instance obtains additional information about the identified data items. The additional information may be the data items, full vectors representing the data items, additional dimensions of binary vectors representing the data items, or other information such as information included in another type of inverted bitmap index. At 2330, the ephemeral computing instance re-ranks the identified data items based on the additional information. At 2332, the ephemeral computing instance returns one or more of the data items associated with the nearest neighbor vectors in response to a request to search the data items based on a search binary vector.

Serverless Locality Sensitive Hashing Using Bitmap Index

Figure 24:
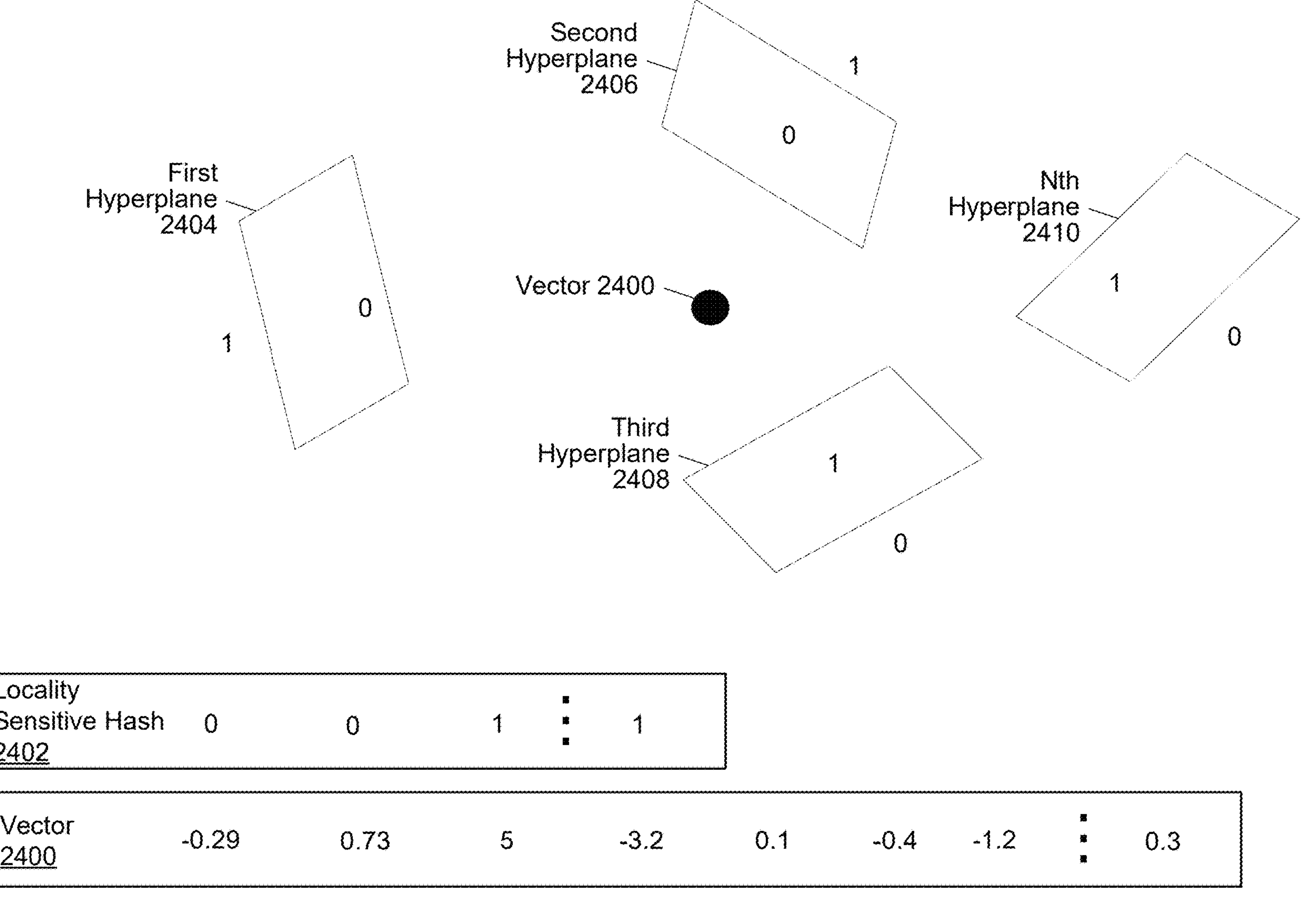
FIG. 24 is a representation of a vector-space and associated hyperplanes with positions which are relative to a vector and indicate a locality sensitive hash for the vector, according to some embodiments.

FIG. 24 is a representation of a vector-space and associated hyperplanes with positions which are relative to a vector and indicate a locality sensitive hash for the vector, according to some embodiments.

A vector-space may have many dimensions. Representing vectors in all dimensions of a vector-space may take a significant amount of computing resources compared to representing the vectors as a locality sensitive hash or set of locality sensitive hashes. A locality sensitive hash may be based on a set of hyperplanes. A hyperplane may be an entity which divides a multidimensional vector-space into two sections. To generate a locality sensitive hash, multiple hyperplanes are generated and the two sides of vector-space defined by each hyperplane is designated as "1" and "0" respectively. A locality sensitive hash 2402 which represents a vector 2400 can be generated based on the position of the vector 2400 in relation to the hyperplanes.

For example, as illustrated in FIG. 24, the position of the vector 2400 in relation to the hyperplanes (i.e., first hyperplane 2404, second hyperplane 2406, third hyperplane 2408, and Nth hyperplane 2410) defines the locality sensitive hash 2402 for the vector 2400. For example, the vector 2400 is positioned on the "0" or the "unset" side of the first hyperplane 2404, so the first hash position of the locality sensitive hash 2402 is 0 or "unset." The vector 2400 is also positioned on the "1" or the "set" side of the Nth hyperplane 2410, so the Nth position of the locality sensitive hash 2402 is 1 or "set." Other vectors with the same locality sensitive hash 2402 are positioned in the same portion of vector-space defined by the set of hyperplanes as the vector 2400, and are therefore likely to be nearest neighbor vectors of the vector 2400.

The hyperplanes which are used to generate a locality sensitive hash may be durably stored for use in creating search hashes and additional hashes for new additions to the dataset. Additionally, a hyperplane translator may track which bitmap of a locality sensitive hash-based inverted bitmap index is associated with a given hyperplane. The hyperplane translator may also be durably stored for use in creating search hashes and additional hashes for new additions to the dataset.

FIG. 25 is a bit array illustrating how a locality sensitive hash-based inverted bitmap index may be searched for data items which are associated with vectors which are potentially nearest neighbor vectors of a search vector, according to some embodiments.

A locality sensitive hash-based inverted index may include a set of bitmaps (such as bitmap for first hash position 2504, bitmap for second hash position 2506, bitmap for third hash position 2508, and bitmap for Nth hash position 2510) which are each associated with a respective hash position of locality sensitive hashes. The locality sensitive hashes correspond to data items, and the data items correspond with bit positions. A data item translator 2500 may store information about the associations between the data items and the bit positions.

Because vectors with the same locality sensitive hash are likely to be nearest neighbor vectors, an ephemeral computing instance may identify data items associated with nearest neighbor vectors of a search vector by using a copy of a locality sensitive hash-based inverted bitmap index. The search vector may be used to generate a search hash 2502 based on the set of hyperplanes which were used to generate the locality sensitive hash-based inverted bitmap index.

An exact match to the search hash 2502, such as search match 2512 at the seventh bit position, indicates that the data item associated with the locality sensitive hash is also associated with a vector which is positioned in the same portion of vector-space as defined by the set of hyperplanes as the vector which was used to generate the search hash 2502. The match may indicate that the vector associated with the data item is a nearest neighbor vector of the vector which was used to generate the search hash 2502 and that the data item is responsive to the search.

FIG. 26 is a block diagram illustrating how Hamming distances as compared to search hashes of a search vector over a set of locality sensitive hash-based inverted bitmap indexes may be used to determine a best match data item for the search vector, according to some embodiments.

A pair of vectors may be relatively close together compared to the distance of the pair of vectors from other vectors of the dataset and on opposite sides of a hyperplane. Similarly, a pair of vectors may be relatively far apart compared to the distance of the pair of vectors from other vectors of the dataset and within the same portion of vector-space as defined by the hyperplanes. Accordingly, a set of locality sensitive hash-based inverted bitmap indexes may provide improved accuracy with regard to identifying data items associated with the nearest neighbor vectors of a search vector as opposed to a single locality sensitive hash-based inverted bitmap index.

For a copy of a set of locality sensitive hash-based inverted bitmap indexes, an ephemeral computing instance may determine a best result 2608 based on the Hamming distances (i.e., Hamming distance for first hash set 2602, Hamming distance for second hash set 2604, and Hamming distance for third hash set 2606) of each locality sensitive hash to a search hash generated using the set of hyperplanes which were used to generate the locality sensitive hashes. A Hamming distance of 0 indicates that the locality sensitive hash is an exact match for the search hash. The ephemeral computing instance may identify a data item based on the data item's association with the most exact matches or the lowest overall Hamming distance across the copy of the set of locality sensitive hash-based inverted bitmap indexes. For example, as illustrated in FIG. 26, the data item associated with the sixth bit position of the set of locality sensitive hash-based inverted bitmap indexes has two instances of locality sensitive hashes being exact matches to the respective search hashes and one instance where the locality sensitive hash has a Hamming distance of 1 relative to the search hash. By either the standard of more exact matches being a better result or the standard of lower overall Hamming distance being a better result, the sixth data item is the best result 2608 of the data set.

Additionally, the ephemeral computing instance may use one standard and take another as a tie-breaker. For example, the ephemeral computing instance may determine the best results using the exact match standard and take the lower Hamming distance as a tiebreaker. For the dataset illustrated in FIG. 26, both the fifth bit position and Mth bit position have one exact match. Between the two, the fifth bit position has a lower overall Hamming distance (i.e., an overall Hamming distance of 2 compared to a Hamming distance of 3), so the fifth data item, corresponding to the fifth bit position, may be the second best result of the dataset and the Mth data item, corresponding to the Mth bit position, may be the third best result of the dataset.

FIG. 27A is a flowchart illustrating how a locality sensitive hash-based inverted bitmap index is made available to be used in a data item filtering process, according to some embodiments.

At 2700, a computing system performing intake for a search of one or more locality sensitive hash-based inverted bitmap indexes obtains vectors which represent respective data items. The computing system performing intake for a search of one or more locality sensitive hash-based inverted bitmap indexes may be an ephemeral computing instance, a compute instance, or another type of computing system. At 2702, the computing system performing intake for a search of one or more locality sensitive hash-based inverted bitmap indexes generates locality sensitive hashes based on the positions of the vectors relative to a set of hyperplanes. At 2704, the computing system performing intake for a search of one or more locality sensitive hash-based inverted bitmap indexes generates one or more inverted hash bitmap indexes to represent the associations between the data items and the locality sensitive hashes.

At 2706, the computing system performing intake for a search of one or more locality sensitive hash-based inverted bitmap indexes durably stores the one or more inverted hash bitmap indexes using bitmap compression. At 2708, the durable storage provides a copy of the one or more inverted hash bitmap indexes and the set of hyperplanes to an ephemeral computing instance in response to a request to search for a data item based on a search vector. A search hash may be generated using the set of hyperplanes.

FIG. 27B is a flowchart illustrating how locality sensitive hashes to be included in locality sensitive hash-based inverted bitmap indexes can be generated, according to some embodiments.

To generate locality sensitive hashes based on the positions of the vectors relative to a set of hyperplanes (2702), a computing system performing intake for a search of one or more locality sensitive hash-based inverted bitmap indexes performs steps 2710-2714. At 2710, the computing system performing intake for a search of one or more locality sensitive hash-based inverted bitmap indexes generates the set of hyperplanes based on the intended length of the locality sensitive hashes, wherein each hyperplane designates a side of vector space as "set" and the other side as "unset." For example, for a locality sensitive hash with an intended length of twenty bits, which would require twenty bitmaps to represent in a locality sensitive hash-based inverted bitmap index, the computing system performing intake for a search of one or more locality sensitive hash-based inverted bitmap indexes would generate twenty hyperplanes. For each hyperplane, each vector is positioned in vector space on the "set" (1) side or the "unset" (0) side, and the bit corresponding to the data item in the bitmap corresponding to the hyperplane is to be set or unset accordingly. One of the "set" or "unset" side of a hyperplane includes the vectors which are positioned on the hyperplane.

At 2712, the computing system performing intake for a search of one or more locality sensitive hash-based inverted bitmap indexes determines, for each vector, the vector's position relative to the "set" and "unset" sides of each of the hyperplanes, i.e., whether the hyperplane's bit position in the data item's locality sensitive hash is to be 1 or 0. At 2714, the computing system performing intake for a search of one or more locality sensitive hash-based inverted bitmap indexes generates the locality sensitive hashes based on the determined positions of the vectors relative to the hyperplanes. The locality sensitive hashes may be generated by generating the locality sensitive hash-based inverted bitmap indexes.

Figure 28A:
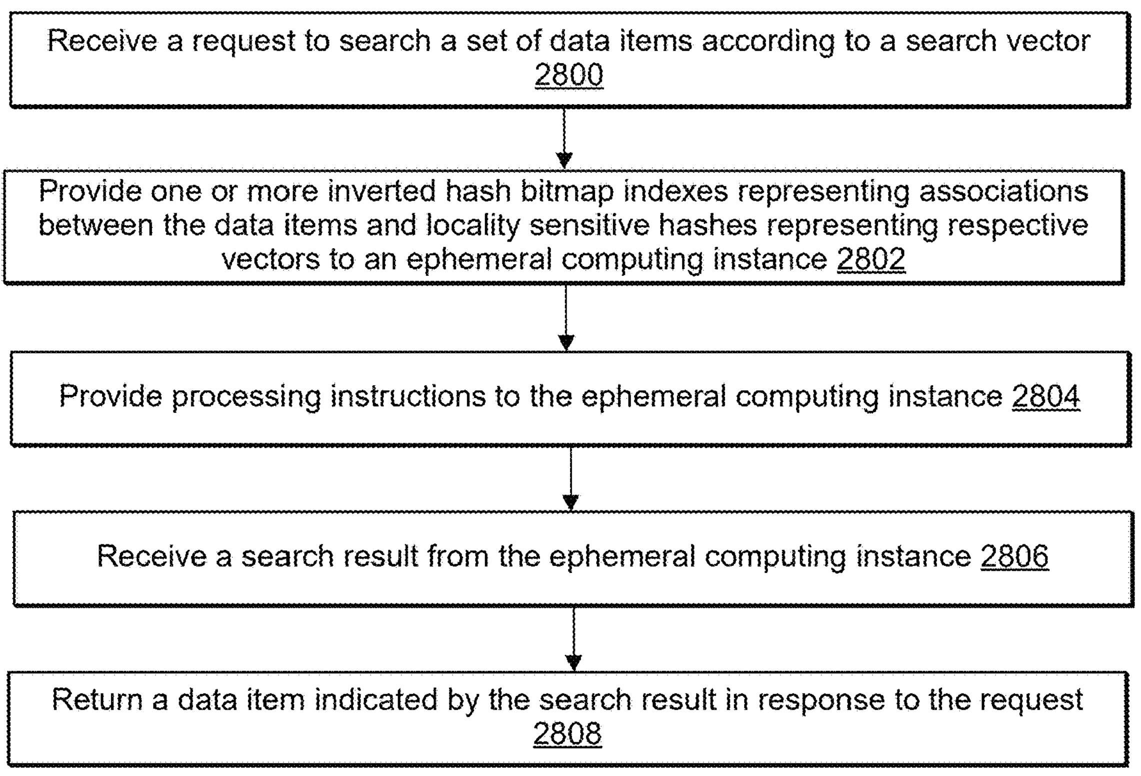
FIG. 28A is a flowchart illustrating how a customer account uses an ephemeral computing instance to perform a data item search process using a locality sensitive hash-based inverted bitmap index, according to some embodiments.

FIG. 28A is a flowchart illustrating how a customer account uses an ephemeral computing instance to perform a data item search process using a locality sensitive hash-based inverted bitmap index, according to some embodiments.

At 2800, a customer account receives a request to search a set of data items according to a search vector. The request may provide the search vector or provide a user query or user provided data item to use to generate the search vector. At 2802, the customer account provides (or causes a durable storage to provide) copies of one or more locality sensitive hash-based inverted bitmap indexes representing associations between the data items and locality sensitive hashes representing respective vectors to an ephemeral computing instance. The customer account may also provide or cause the durable storage to provide copies of a translator and a set of hyperplanes which are associated with the locality sensitive hash-based inverted bitmap indexes to the ephemeral computing instance. At 2804, the customer account provides (or causes a durable storage to provide) a copy of processing instructions for performing a search of the data items using the copy of the locality sensitive hash-based inverted bitmap index and the search vector or a search hash generated using the search vector to the ephemeral computing instance.

At 2806, the customer account receives a search result from the ephemeral computing instance. The search result may a data item or an indication of a data item, for example the search result may be the bit position in a copy of the locality sensitive hash-based inverted bitmap index of the identified data item. At 2808, the customer account returns the data item indicated by the search result in response to the request to search the set of data items according to the search vector.

Figure 28B:
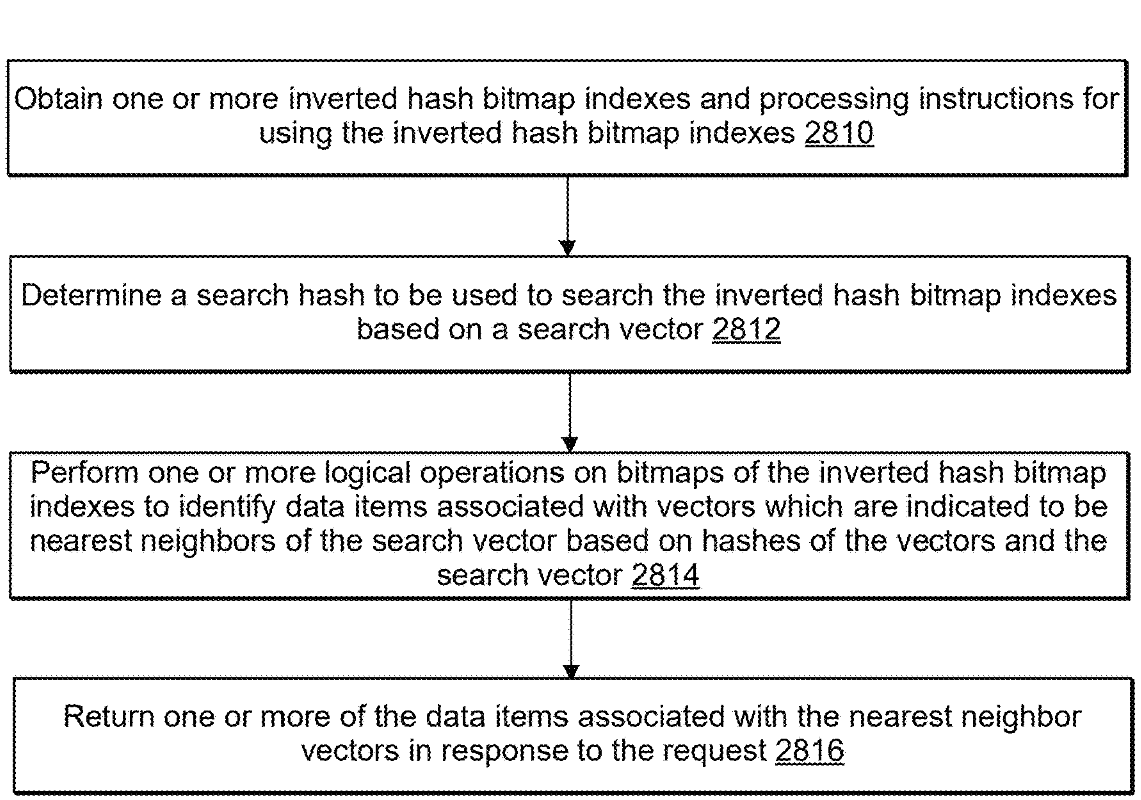
FIG. 28B is a flowchart illustrating how an ephemeral computing instance performs a data item search process using a locality sensitive hash-based inverted bitmap index, according to some embodiments.

FIG. 28B is a flowchart illustrating how an ephemeral computing instance performs a data item search process using a locality sensitive hash-based inverted bitmap index, according to some embodiments.

At 2810, an ephemeral computing instance obtains one or more inverted hash bitmap indexes and processing instructions for using the locality sensitive hash-based inverted bitmap indexes to perform a nearest neighbor search using a search hash. At 2812, the ephemeral computing instance determines a search hash to be used to search the locality sensitive hash-based inverted bitmap indexes based on a search vector. The ephemeral computing instance may determine the search hash based on being provided the search hash, or based on the position of a search vector relative to the hyperplanes which were used to generate the one or more locality sensitive hash-based inverted bitmap indexes.

At 2814, the ephemeral computing instance performs one or more logical operations on bitmaps of the one or more locality sensitive hash-based inverted bitmap indexes to identify data items associated with vectors which indicated to be nearest neighbor vectors of the search vector based on hashes of the vectors and the search vector. For example, the ephemeral computing instance may use a XOR operation to generate counts which equal Hamming distances of the hashes associated with the data items as compared to the search hash. A Hamming distance of 0 may indicate an exact match to the search hash. A data item with the most number of exact match hashes to the search hash or with the lowest Hamming distance to the search hash may be identified as potentially having a vector which is a nearest neighbor vector to the vector used to generate the search hash. The ephemeral computing instance may perform a re-ranking of a group of data items, for example by obtaining and analyzing vectors of the data items compared to the search vector, or the data items compared to a user provided query or data item which was used to generate the search vector. At 2816, the ephemeral computing instance returns one or more of the data items associated with the nearest neighbor vectors in response to a request which indicated the search vector to be used to search the one or more locality sensitive hash-based inverted bitmap indexes.

Figure 28C:
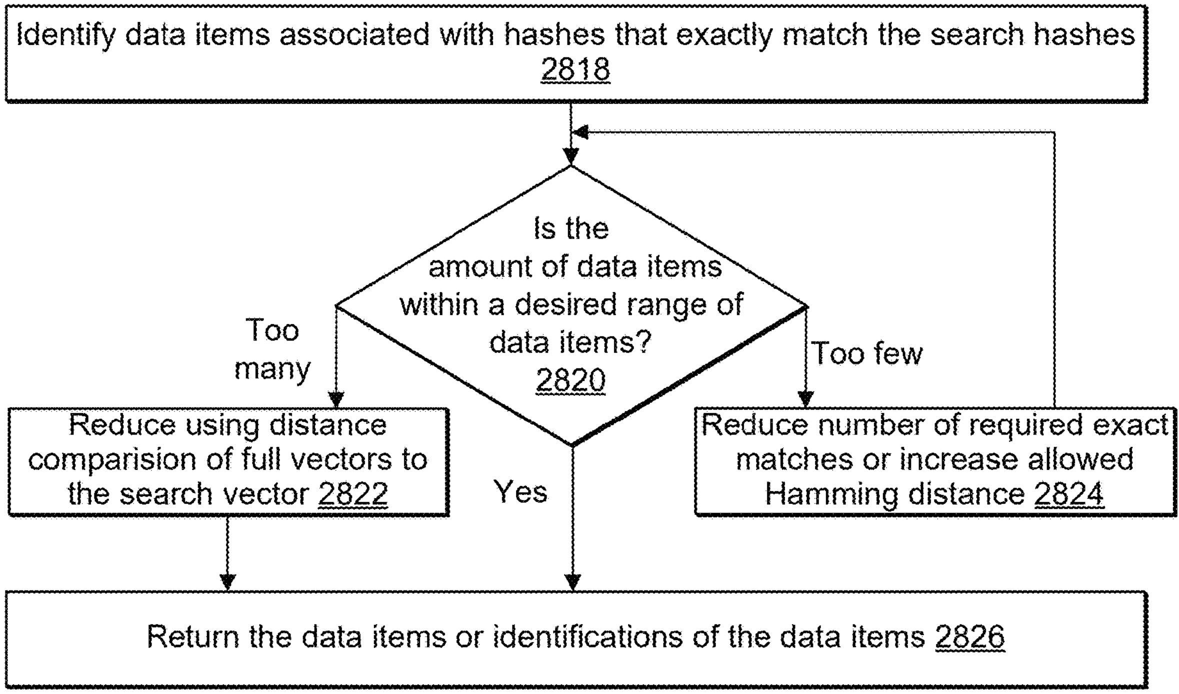
FIG. 28C is a flowchart illustrating how an ephemeral computing instance adjusts an amount of data items identified using a locality sensitive hash-based inverted bitmap index to be within a desired range of data items, according to some embodiments.

FIG. 28C is a flowchart illustrating how an ephemeral computing instance adjusts an amount of data items identified using a locality sensitive hash-based inverted bitmap index to be within a desired range of data items, according to some embodiments.

At 2818, the ephemeral computing instance identifies a set of data items which correspond to hashes that exactly match the corresponding search hashes. At 2820, the ephemeral computing instance determines whether the amount of identified data items is within a desired range of data items. The desired range may be included in a request to identify data items, and the desired range may be a default range which is included in a set of program instructions delivered to the ephemeral computing instance.

If the ephemeral computing instance determines the amount of data items is above the desired range, at 2822 the ephemeral computing instance reduces the amount of data items to be within the desired range by using distance comparison of full vector to the search vector. The distance comparison may be cosine similarity, Euclidean distance, dot product, or another type of distance comparison. For example, if the desired range of an amount of data items is 4-6 data items and a search using a set of locality sensitive hash-based inverted bitmap indexes identifies 8 data items that are all associated with only hashes that exactly match the search hash, the ephemeral computing instance may identify the 6 data items associated with full vectors with the closest cosine similarity to the search vector. At 2826, the ephemeral computing instance returns the data items or identifications of the data items.

If the ephemeral computing instance determines the amount of data items is below the desired range, at 2824 the ephemeral computing instance reduces the number of required exact matches or increases the allowed Hamming distance. For example, for a search of the locality sensitive hash-based inverted bitmap indexes which requires an exact match at all the locality sensitive hash-based inverted bitmap indexes for a desired range of 4-6 data items which returns 3 data items, the ephemeral computing instance may adjust the search to require exact matches at all but one locality sensitive hash-based inverted bitmap index. The ephemeral computing instance may return to step 2820 to determine whether the amount of data items is within the desired range.

If the ephemeral computing instance determines that the amount of data items is within the desired range of data items, at 2826 the ephemeral computing instance returns the data items or identifications of the data items. The ephemeral computing instance may also perform a re-ranking operation similar to the re-ranking operation described for the vector-based inverted bitmap index with respect to FIG. 20.

Example Computer System

Figure 29:
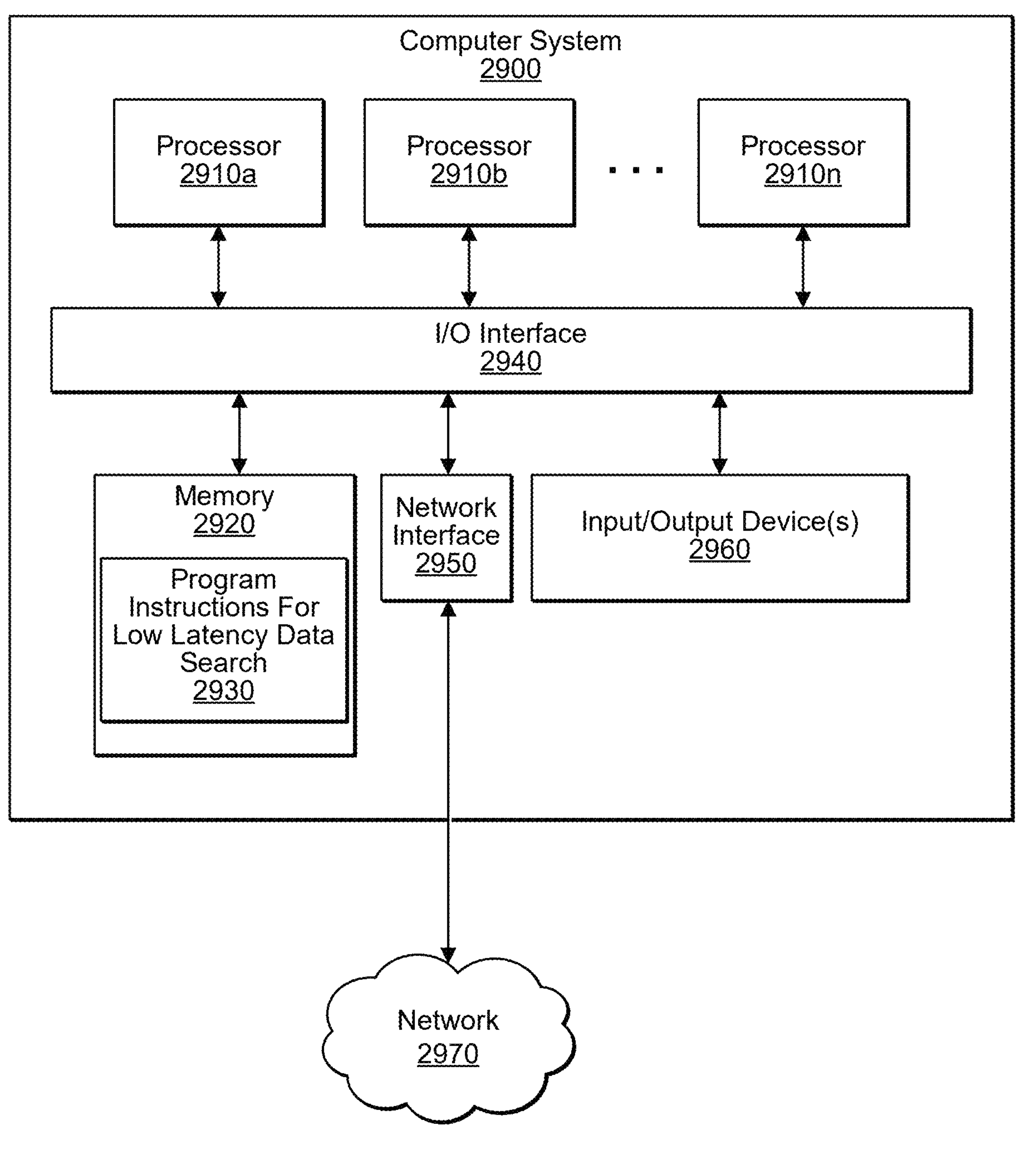
FIG. 29 is a block diagram illustrating an example computer system that implements some, or all, of the techniques described herein, according to some embodiments.

FIG. 29 is a block diagram illustrating an example computer system that implements some or all of the techniques described herein, according to some embodiments.

FIG. 29 illustrates exemplary computer system 2900 usable to implement the low latency data search as described above with reference to FIGS. 1-28B. In different embodiments, computer system 2900 may be any of various types of devices, including, but not limited to, a network computer, a mobile device, a consumer device, application server, storage device, a peripheral device such as a switch, modem, router, or in general any type of computing or electronic device.

Various embodiments of program instructions for a low latency data search 2930, as described herein, may be executed in one or more computer systems 2900, which may interact with various other devices. Note that any component, action, or functionality described above with respect to FIGS. 1-28B may be implemented on one or more computers configured as computer system 2900 of FIG. 29, according to various embodiments. In the illustrated embodiment, computer system 2900 includes one or more processors 2910 coupled to a system memory 2920 via an input/output (I/O) interface 2940. Computer system 2900 further includes a network interface 2950 coupled to I/O interface 2940, and one or more input/output devices 2960. In some cases, it is contemplated that embodiments may be implemented using a single instance of computer system 2900, while in other embodiments multiple such computer systems, or multiple nodes making up computer system 2900, may be configured to host different portions or instances program instructions as described above for various embodiments. For example, in one embodiment some elements of the program instructions may be implemented via one or more nodes of computer system 2900 that are distinct from those nodes implementing other elements.

In some embodiments, computer system 2900 may be implemented as a system on a chip (SoC). For example, in some embodiments, processors 2910, memory 2920, I/O interface 2940 (e.g., a fabric), etc. may be implemented in a single SoC comprising multiple components integrated into a single chip. For example, a SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 2920 may be configured to store compression or decompression program instructions for a low latency data search 2930 accessible by one or more of the processors 2910. In various embodiments, system memory 2920 may be implemented using any suitable memory technology, such as static random-access memory (SRAM), synchronous dynamic RAM (SDRAM), nonvolatile/Flash-type memory, or any other type of memory. In the illustrated embodiment, program instructions for a low latency data search 2930 may be configured to implement any of the functionality described above. In some embodiments, program instructions and/or data may be received, sent, or stored upon different types of computer-accessible media or on similar media separate from system memory 2920 or computer system 2900.

In one embodiment, I/O interface 2940 may be configured to coordinate I/O traffic between processor 2910, system memory 2920, and any peripheral devices in the device, including network interface 2950 or other peripheral interfaces, such as input/output devices 2960. In some embodiments, I/O interface 2940 may perform any necessary protocol, timing, or other data transformations to convert data signals from one component (e.g., system memory 2920) into a format suitable for use by another component (e.g., processor 2910). In some embodiments, I/O interface 2940 may include support for devices attached through various types of peripheral buses, such as a variant of the Peripheral Component Interconnect (PCI) bus standard or the Universal Serial Bus (USB) standard, for example. In some embodiments, the function of I/O interface 2940 may be split into two or more separate components, such as a north bridge and a south bridge, for example. Also, in some embodiments, some or all of the functionality of I/O interface 2940, such as an interface to system memory 2920, may be incorporated directly into processor 2910.

Network interface 2950 may be configured to allow data to be exchanged between computer system 2900 and other devices attached to a network 2970 (e.g., carrier or agent devices) or between nodes of computer system 2900. Network 2970 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2950 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 2960 may, in some embodiments, include one or more display terminals, keyboards, keypads, touchpads, scanning devices, voice or optical recognition devices, or any other devices suitable for entering or accessing data by one or more computer systems 2900. Multiple input/output devices 2960 may be present in computer system 2900 or may be distributed on various nodes of computer system 2900. In some embodiments, similar input/output devices may be separate from computer system 2900 and may interact with one or more nodes of computer system 2900 through a wired or wireless connection, such as over network interface 2950.

As shown in FIG. 29, memory 2920 may include program instructions for a low latency data search 2930, which may be processor-executable to implement any element or action described above. In one embodiment, the program instructions may implement the methods described above. In other embodiments, different elements and data may be included.

Computer system 2900 may also be connected to other devices that are not illustrated, or instead may operate as a stand-alone system. In addition, the functionality provided by the illustrated components may in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2900 may be transmitted to computer system 2900 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

storage devices configured to store documents;

a database storing indexes that index document characteristics of the documents stored in the storage devices; and one or more computing devices configured to implement on-demand searching capacity for searching documents stored in the storage devices, wherein to implement the on-demand searching capacity, the one or more computing devices are configured to:

in response to receiving an initial query for a given domain, instantiate an ephemeral computing instance for searching for documents having characteristics within the given domain;

add index files to a memory of the ephemeral computing instance that have been retrieved from the database;

generate a query response for the initial query using the index files that have been added to the memory of the ephemeral computing instance;

asynchronously, cause a container-based computing environment to be launched for processing additional queries for the given domain; and load the container-based computing environment with index files for the given domain; and in response to receiving a subsequent query for the given domain within a threshold amount of time from when the initial query was received, generate a query response using the container-based computing environment to which the index files for the given domain have been loaded.

2. The system of claim 1, wherein the one or more computing devices are further configured to:

release the ephemeral computing instance subsequent to the threshold amount of time passing since generating the query response for the initial query; and shutdown the container-based computing environment in response to not receiving a subsequent query within the threshold amount of time.

3. The system of claim 1, wherein launching the container-based computing environment bypasses a container replication process used when launching other container-based computing environments.

4. The system of claim 1, wherein:

in response to receiving the initial query for the given domain, the one or more computing devices are further configured to:

launch a pod of ephemeral computing instances for use in performing subsequent queries using the container-based computing environment.

5. The system of claim 4, wherein the pod comprises:

an ephemeral computing instance for asynchronously launching the container-based computing environment; and an ephemeral computing instance for generating the query response using the container-based computing environment.

6. The system of claim 5, wherein the ephemeral computing instance for asynchronously launching the container-based computing environment, is configured to:

in response to successfully launching the container-based computing environment, update one or more entries of the database for the given domain to include a network address for the container-based computing environment.

7. The system of claim 6, wherein the ephemeral computing instance for searching for documents having characteristics within the given domain is configured to:

retrieve the network address for the container-based computing environment from the database in response to the receiving the subsequent query for the given domain; and cause the ephemeral computing instance for generating the query response using the container-based computing environment to generate a query response using the container-based computing environment located at the retrieved network address.

8. The system of claim 1, wherein the one or more computing devices are further configured to, in response to receiving the initial query for the given domain:

asynchronously, cause a second container-based computing environment to be launched for processing additional queries for the given domain;

load the second container-based computing environment with updated index files for the given domain while the container-based computing environment is being used to generate query responses for the given domain; and alternate between using the container-based computing environment and the second container-based computing environment for generating query responses for the given domain, wherein a given one is used for generating query responses while the other given one is loaded with most recently updated index files.

9. The system of claim 8, wherein the one or more computing devices are further configured to:

replace a given one of the container-based computing environments not currently being used for generating query responses with a larger or smaller container-based computing environment while continuing to generate query responses using the other given one of the container-based computing environments.

10. A method, comprising:

receiving an initial query for a given domain at a hybrid serverless computing and durable computing search system;

generating, in response to receiving the initial query, a query response using indexes for the given domain added to a memory of a serverless computing instance that provides on-demand serverless computing capacity;

providing the generated response for the initial query;

receiving a subsequent query for the given domain at the hybrid serverless computing and durable computing search system;

generating, in response to receiving the subsequent query, a query response using indexes for the given domain loaded into a container-based computing environment, wherein the container-based computing environment was launched responsive to receiving the initial query for the given domain and loaded with the indexes for the given domain; and providing the generated response for the subsequent query.

11. The method of claim 10, wherein the indexes for the given domain comprise:

one or more inverted bitmap indexes for searching for documents based on document characteristics.

12. The method of claim 11, wherein at least one of the one or more inverted bitmap indexes is configured to be used to perform an approximate nearest neighbor vector search, and wherein vectors are used to represent characteristics of documents available to be searched.

13. The method of claim 11, wherein at least one of the one or more inverted bitmap indexes is configured to be used in a filter operation to filter documents based on characteristics, wherein filter results are used to generate the response to the initial query or the subsequent query.

14. The method of claim 10, further comprising:

scaling the serverless computing instance and the container-based computing environment to zero instances in response to not receiving a query for the given domain within a threshold amount of time from when the initial query was received or in response to not receiving another query for the given domain within the threshold amount of time since a last query was received.

15. The method of claim 10, further comprising:

scaling up or scaling down a size of the container-based computing environment in response to a change in volume of queries received or in response to a change in a size of the indexes for the given domain.

16. The method of claim 10, further comprising:

in response to receiving the initial query for the given domain, launching a pod of serverless computing instances comprising:

a first additional serverless computing instance for asynchronously launching the container-based computing environment; and a second additional serverless computing instance for generating the query response using the container-based computing environment;

asynchronously launching, by the first additional serverless computing instance, the container-based computing environment for processing additional queries for the given domain; and loading, by the first additional serverless computing instance, the container-based computing environment with index files for the given domain.

17. The method of claim 16, further comprising:

in response to receiving the subsequent query for the given domain, retrieving, performed by the serverless computing instance used for generating the query response, a network address for the container-based computing environment;

connecting the second additional serverless computing instance with the container-based computing environment located at the retrieved network address; and generating a query response, performed by the second additional serverless computing instance, using the container-based computing environment.

18. One or more non-transitory, computer-readable storage media storing program instructions that, when executed on or across one or more processors, cause the one or more processors to:

generate, in response to receiving an initial query for a given domain at a hybrid serverless computing and durable computing search system, a query response using indexes for the given domain added to a memory of a serverless computing instance that provides on-demand serverless computing capacity;

provide the generated response for the initial query;

generate, in response to receiving a subsequent query for the given domain at the hybrid serverless computing and durable computing search system, a query response using indexes for the given domain loaded into a container-based computing environment, wherein the container-based computing environment was launched responsive to receiving the initial query for the given domain and loaded with the indexes for the given domain; and provide the generated response for the subsequent query.

19. The one or more non-transitory, computer-readable storage media of claim 18, wherein the program instructions, when executed on or across the one or more processors, further cause the one or more processors to:

in response to receiving the initial query for the given domain, launch a pod of serverless computing instances comprising:

a first additional serverless computing instance for asynchronously launching the container-based computing environment; and a second additional serverless computing instance for generating the query response using the container-based computing environment.

20. The one or more non-transitory, computer-readable storage media of claim 18, wherein the program instructions, when executed on or across the one or more processors, further cause the one or more processors to:

in response to receiving the subsequent query for the given domain, retrieve a network address for the container-based computing environment; and connecting the second additional serverless computing instance with the container-based computing environment located at the retrieved network address.

* * * * *